United States Patent
Weinberger et al.

(10) Patent No.: US 11,799,358 B2
(45) Date of Patent: Oct. 24, 2023

(54) MANUALLY OPERATED GENERATOR AND METHODS OF USE

(71) Applicant: MIW Associates LLC, Havertown, PA (US)

(72) Inventors: Marvin Weinberger, Havertown, PA (US); Edward T. Polkowski, Rydal, PA (US)

(73) Assignee: MIW Associates LLC, Havertown, PA (US)

( * ) Notice: Subject to any disclaimer, the term of this patent is extended or adjusted under 35 U.S.C. 154(b) by 221 days.

(21) Appl. No.: 16/643,957

(22) PCT Filed: May 8, 2019

(86) PCT No.: PCT/US2019/031303
§ 371 (c)(1),
(2) Date: Mar. 3, 2020

(87) PCT Pub. No.: WO2019/217544
PCT Pub. Date: Nov. 14, 2019

(65) Prior Publication Data
US 2021/0057963 A1 Feb. 25, 2021

Related U.S. Application Data

(60) Provisional application No. 62/668,398, filed on May 8, 2018.

(51) Int. Cl.
*H02K 7/18* (2006.01)
*F03G 5/06* (2006.01)
(Continued)

(52) U.S. Cl.
CPC .............. *H02K 7/1853* (2013.01); *F03G 5/06* (2013.01); *H02K 5/225* (2013.01); *H02K 7/116* (2013.01)

(58) Field of Classification Search
CPC .... H02K 7/1853; H02K 7/1861; F03G 5/062; F03G 5/065; F03G 5/066
See application file for complete search history.

(56) References Cited

U.S. PATENT DOCUMENTS

| 4,556,366 A | 12/1985 | Sargisson et al. |
| 7,391,180 B2 | 6/2008 | Armiroli et al. |
| (Continued) | | |

FOREIGN PATENT DOCUMENTS

| ES | 2431639 | 11/2013 | |
| GB | 2519778 A | * 5/2015 | .............. F03B 13/00 |
| (Continued) | | | |

OTHER PUBLICATIONS

Song, Machine Translation of KR0140329, May 1999 (Year: 1999).*
International Search Report and Written Opinion dated Sep. 3, 2019 for corresponding PCT Application No. PCT/US2019/31303.

*Primary Examiner* — Eric Johnson
(74) *Attorney, Agent, or Firm* — Duane Morris LLP

(57) ABSTRACT

A power generation device includes a body, an electric generator, a hub, and an arm. The body extends from a first end to a second end and a longitudinal axis extends from the first end to the second end. The electric generator is housed within the body and includes a rotor. The hub is coupled to the body at the first end and is rotatable with respect to the body about the longitudinal axis. The arm extends from the hub such that the arm is rotatable with the hub about the longitudinal axis. The arm is pivotably coupled to the hub such that arm is pivotable with respect to the hub about a pivot axis that is non-collinear with the longitudinal axis. Rotation of the hub and the arm about the longitudinal axis causes rotation of the rotor of the generator to generate electrical power.

20 Claims, 23 Drawing Sheets

(51) Int. Cl.
*H02K 5/22* (2006.01)
*H02K 7/116* (2006.01)

(56) References Cited

U.S. PATENT DOCUMENTS

| | | | |
|---|---|---|---|
| 2004/0123413 A1 | 7/2004 | Bissonnette et al. | |
| 2004/0130156 A1* | 7/2004 | Hartman | H02J 7/32 290/1 A |
| 2006/0125243 A1 | 6/2006 | Miller | |
| 2008/0150378 A1* | 6/2008 | Heinrich | H02K 7/1853 310/78 |
| 2013/0033856 A1* | 2/2013 | Tangeman | F21L 13/06 310/67 R |
| 2014/0070674 A1* | 3/2014 | Chung | H02K 7/1853 310/75 B |
| 2014/0168958 A1* | 6/2014 | Unger | F21L 13/06 362/183 |
| 2017/0074246 A1 | 3/2017 | Richert et al. | |

FOREIGN PATENT DOCUMENTS

| | | | |
|---|---|---|---|
| KR | 0140329 Y1 * | 5/1999 | |
| WO | 2016069713 | 5/2016 | |

* cited by examiner

MANUALLY OPERATED GENERATOR AND METHODS OF USE

CROSS-REFERENCE TO RELATED APPLICATIONS

This application is a national phase entry under 35 U.S.C. § 371 of international patent application no. PCT/US2019/031303, filed May 8, 2019, which claims priority to U.S. Provisional Patent Application No. 62/668,398, filed May 8, 2018, the entireties of which are incorporated herein by reference.

BACKGROUND

In emergency situations, it is sometimes necessary to provide power to an electronic device in order to use the device. For example, during a power outage, a generator, such as a diesel generator, can be used to provide emergency power. However, in some circumstances, a large generator is impractical, is not available and/or cannot meet the needs of the user. For example, when backpacking in remote areas power may be needed in emergency situations. In such situations, a manually powered generator can be used.

SUMMARY

In one aspect, a power generation device includes a body, an electric generator, a hub, and an arm. The body extends from a first end to a second end and a longitudinal axis extends from the first end to the second end. The electric generator is housed within the body and includes a rotor. The hub is coupled to the body at the first end and is rotatable with respect to the body about the longitudinal axis. The arm extends from the hub such that the arm is rotatable with the hub about the longitudinal axis. The arm is pivotably coupled to the hub such that arm is pivotable with respect to the hub about a pivot axis that is non-collinear with the longitudinal axis. Rotation of the hub and the arm about the longitudinal axis causes rotation of the rotor of the generator to generate electrical power.

In another aspect, a power generation device includes a body, an electric generator, a hub, and an arm. The body extends from a first end to a second end. The electric generator is housed within the body and includes a rotor. The hub is coupled to the body and is rotatable with respect to the body. The arm is connected to the hub and is rotatable with the hub. Rotation of the hub and the arm with respect to the body causes rotation of the rotor of the generator to generate electrical power. The torque required to rotate the arm and the hub with respect to the body is variable.

In another aspect, an emergency signal generating system includes a power generation device and a communications device. The power generation device includes a body, an electric generator, and an arm. The electric generator is housed within the body and includes a rotor. The arm is coupled to the body and is rotatable with respect to the body. Rotation of the arm causes rotation of the rotor of the generator to generate electrical power. The communications device is configured to be electrically coupled to the power generation device. The communication device is configured to, after receiving power from the power generation device, transmit data to a communications network.

In another aspect, a power and control device includes an energy source, a user interface, and a connector. The connector is configured to connect to a tool such that the tool receives electrical energy from the energy source and the tool is controllable via the user interface.

BRIEF DESCRIPTION OF THE DRAWINGS

The features and advantages of the embodiments described herein will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1A:
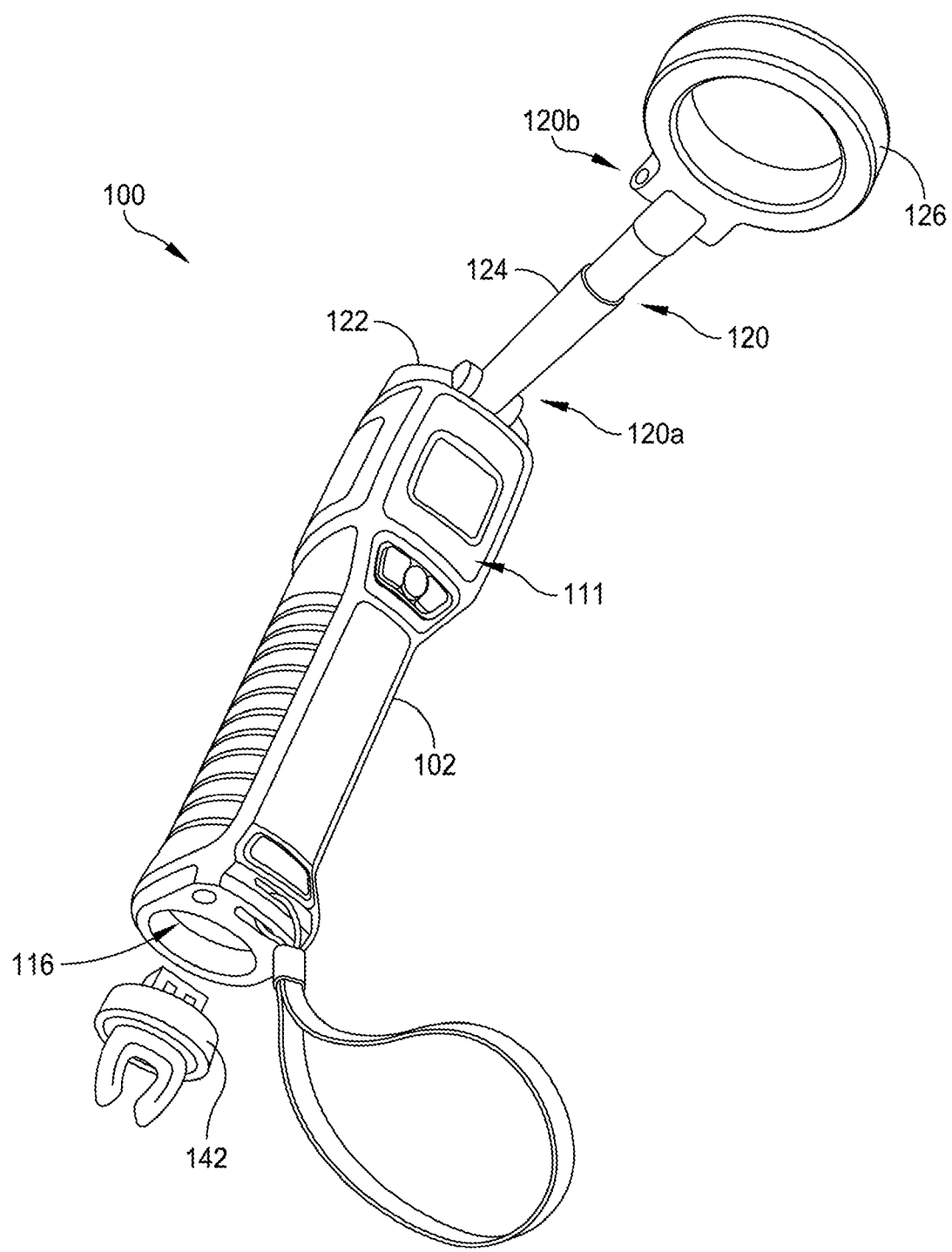
FIG. 1A shows a perspective view of a power generation device, according to one embodiment, with the arm extended.

The description of the preferred embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship.

When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive; as another example, the phrase "about 8%" preferably (but not always) refers to a value of 7.2% to 8.8%, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included."

The present disclosure provides manually operated generators, methods of use of such generators, and emergency systems using such generators. The generators can be used to power electronic devices to, for example, produce a distress signal or message that can be used to help locate a hiker in a remote area. The generators described herein can be used in one or both of a cranking mode and a twirling mode. The generator can be used to power a variety of devices. For example, the generator can be used to power an emergency signal device, as will be described in further detail herein. Alternatively, the generator can be used to power a flashlight (such as an LED flashlight or a UV flashlight), a lantern, a reading lamp, a bright strobe light, an emergency flasher, a Morse code flasher, a firestarter, a siren, a directional sound amplifier, a speaker system, an ultrasonic dog whistle, a cell phone charger, a cell phone signal booster, a satellite phone charger, a mesh networking radio (such as the GOTENNA PRO mesh networking radio supplied by goTenna, Inc. of Brooklyn, N.Y.), a range finder, a radio (e.g., AM/FM/weather), an air pump, a water purifier, an electronic compass, a stun gun, a hand/body warmer, and a fan.

Figure 1B:
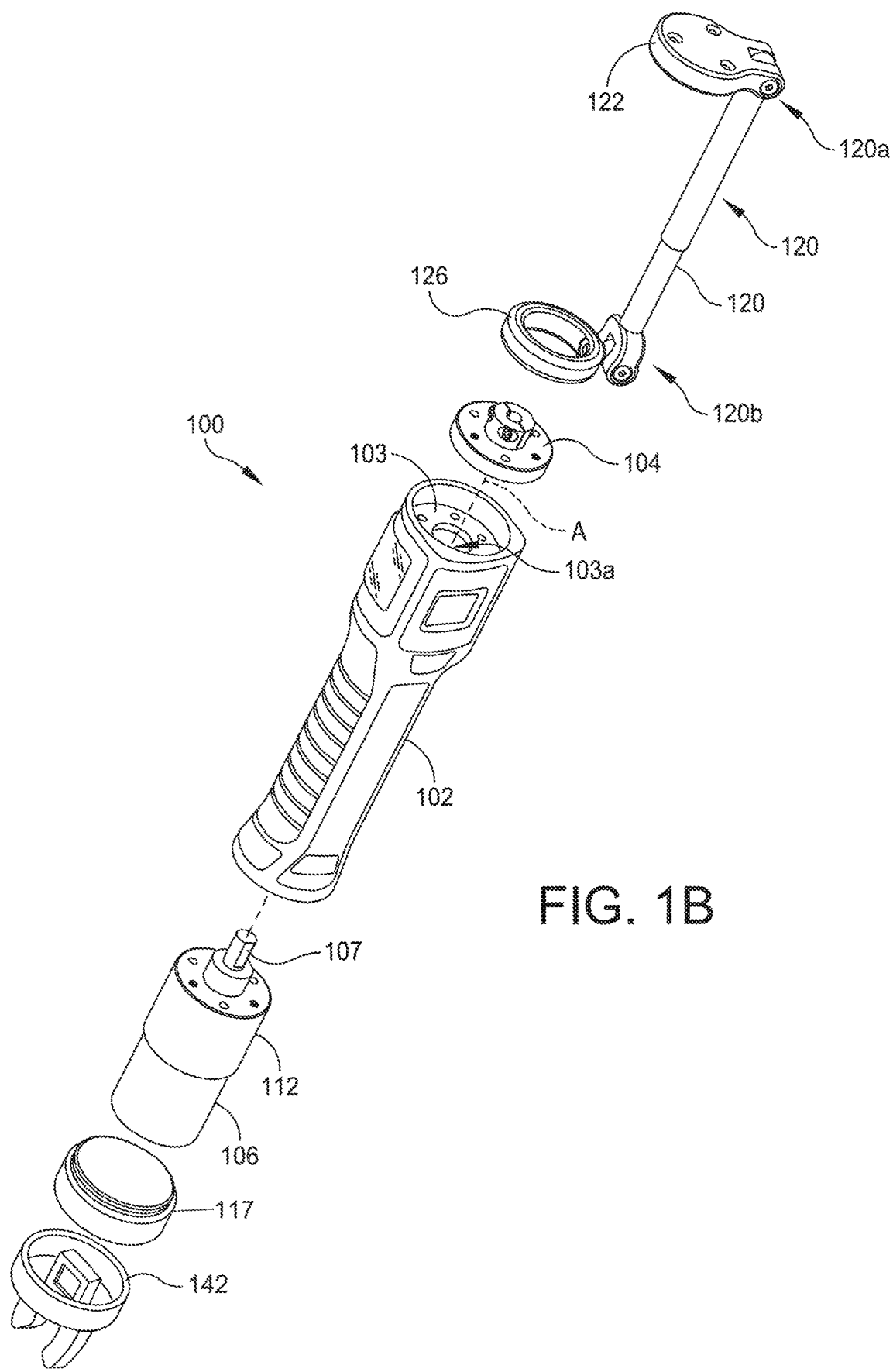
FIG. 1B shows an exploded view of the power generation device of FIG. 1A.

As shown, for example, in FIGS. 1A and 1B, in one embodiment, a power generation device 100 includes a body 102 and a hub 104. As will be described further herein, and as shown in FIG. 1B, the body 102 houses a generator 106 that is configured to produce electrical output in response to rotation of the hub 104. The body 102 can also house a controller module 110 (shown in FIG. 16), a user interface 111 (shown in FIG. 1A), a gearbox 112 (shown in FIG. 1B), and/or any other necessary or appropriate components, as will be described further herein. The body 102 can be any appropriate shape. For example, in one embodiment, shown in FIG. 1A, the body 102 is generally cylindrical and includes a section that the user may comfortably hold (see FIGS. 8 and 9).

In at least one embodiment, the body 102 includes ridges or facets on its exterior surface. This allows the body 102 to be held securely against an object, such as a tree or table top. This may allow the user to rotate the hub 104 with more force while maintaining the body 102 stationary. Additionally, a strap, rope, or band can be used to secure the body 102 to the object so that the user does not have to hold the body 102 during operation. Additionally or alternatively, the body 102 may include a magnetic base. The magnetic base allows the body 102 to be attached to an object, such as a vehicle, to allow operation of the power generation device 100 without holding the body 102.

The hub 104 is configured to rotate about a longitudinal axis A of the body 102, shown in FIG. 1B. The hub 104 is coupled to the rotor of the generator 106 such that rotation of hub 104 causes rotation of the rotor. For example, referring to FIGS. 11-13, a shaft 107 rotatably coupled to the rotor may extend from the gearbox 112 and the hub 104 may include a clamp 105 configured to engage the shaft 107. For example, the clamp 105 may be a split ring and screws 105a may be provided to tighten the clamp 105 on the shaft 107. In some embodiments, shaft 107 may include a flat 107a configured to align with a corresponding flat in the clamp 105 to prevent slippage of the hub 104 with respect to the shaft 107.

As a result of this coupling of the hub 104 and rotor, rotation of the hub 104 causes the generator 106 to produce an electrical output. In one embodiment, one or more gears of the gearbox 112 couple the hub 104 to the rotor of the generator 106, thereby controlling the rate of rotation of the rotor with respect to the hub 104. The gearbox 112 can have any appropriate gear ratio. For example, in one embodiment, the gear ratio is 20:1 (i.e., one rotation of the hub 104 results in 20 rotations of the rotor). In another embodiment, the gear ratio is 35:1. In another embodiment, the gear ratio is between 20:1 and 35:1.

Figure 11:
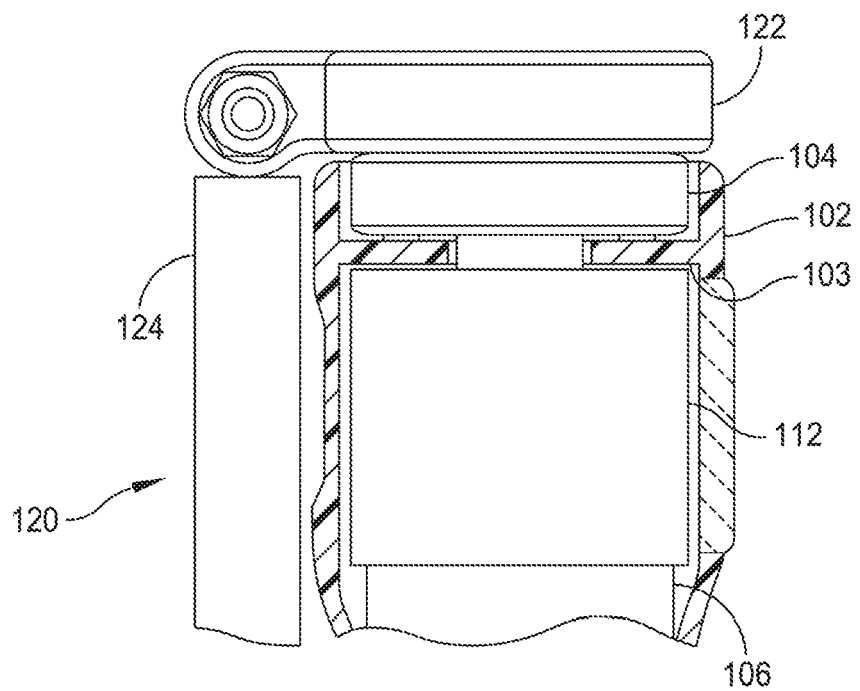
FIG. 11 shows a detail view of the generator and gearbox coupled to the hub, according to some embodiments described herein.

As shown in the exploded view of FIG. 1B and the cross-sectional view of FIG. 11, the body 102 may include a flange 103 configured to couple to and retain the gearbox 112 and generator 106. In some embodiments, as shown, the flange includes one or more fastener holes configured to receive screws or other fasteners to couple to corresponding fastener holes in the gearbox 112. The shaft 107 extends through a bore 103a in the flange 103 to couple to the hub 104.

Figure 8:
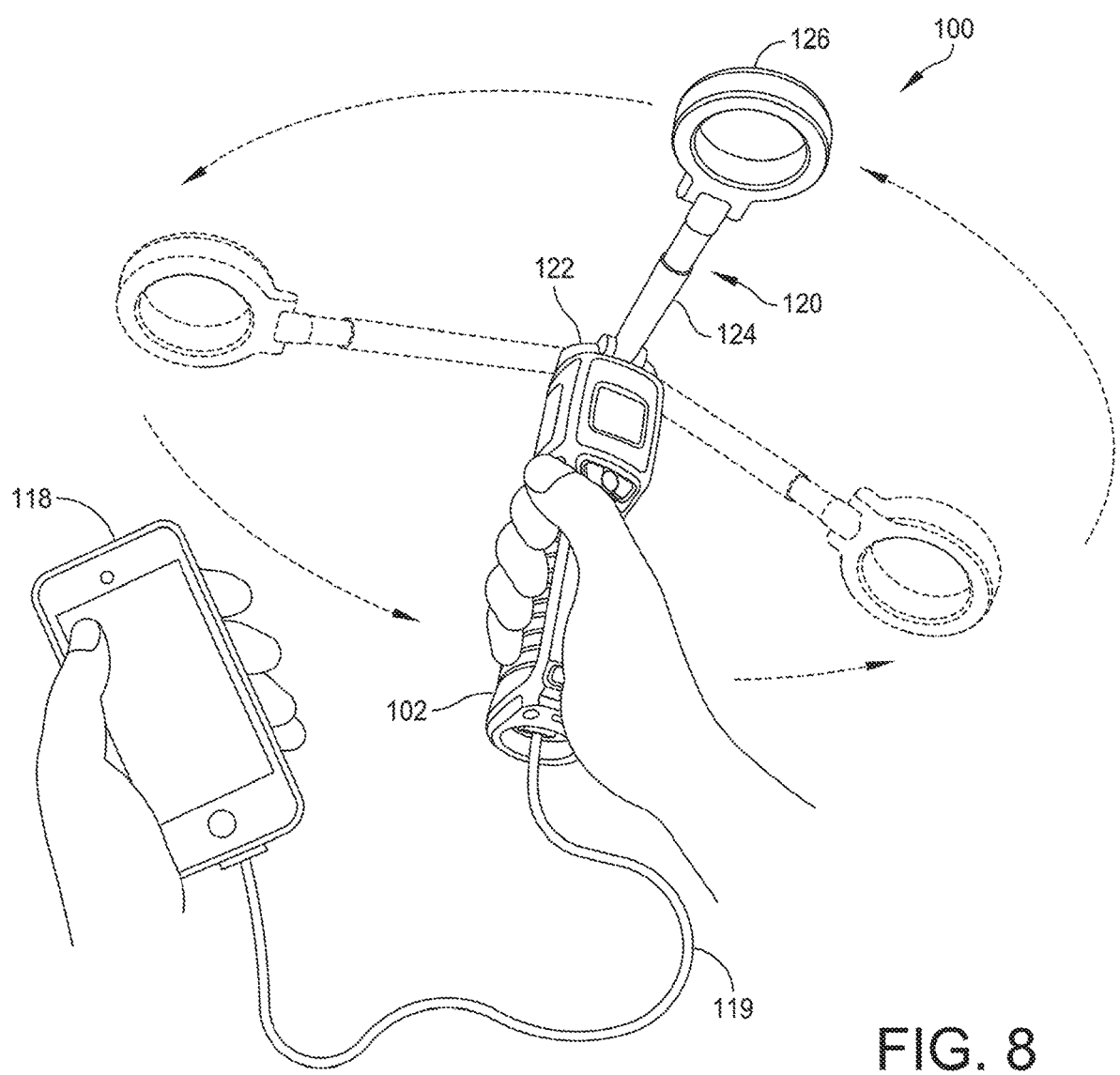
FIG. 8 shows the power generation device of FIG. 1A in use in a twirling mode of operation.
Figure 10:
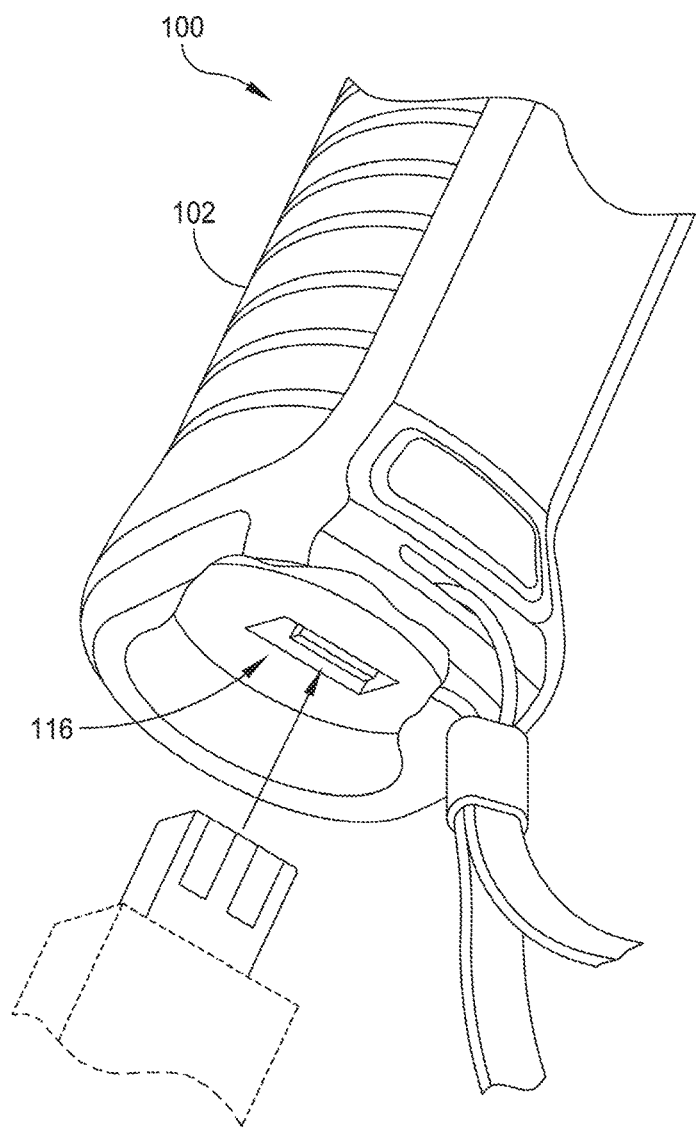
FIG. 10 illustrates an external device being inserted into the output connector of the power generation device of FIG. 1A.

In various embodiments, the body 102 also includes an output connector 116 (shown in FIGS. 1A and 10) configured to electrically couple the generator 106 to one or more external devices 118 (as shown in FIG. 8). In some embodiments, as shown in FIG. 1B, the output connector 116 is integrated into a cap 117 that is coupled to the end of the body 102. The output connector 116 can be configured to couple directly to the external device 118 or couple to the external device 118 via a cable. For example, the output connector 116 can be a USB port, which can be coupled to the external device 118 via a USB cable 119. In one embodiment, the power generation device 100 includes a cord that is permanently connected to the body 102. For example, the power generation device 100 can include a retractable cord that can be deployed by the user to connect to the external device 118.

Figure 24:
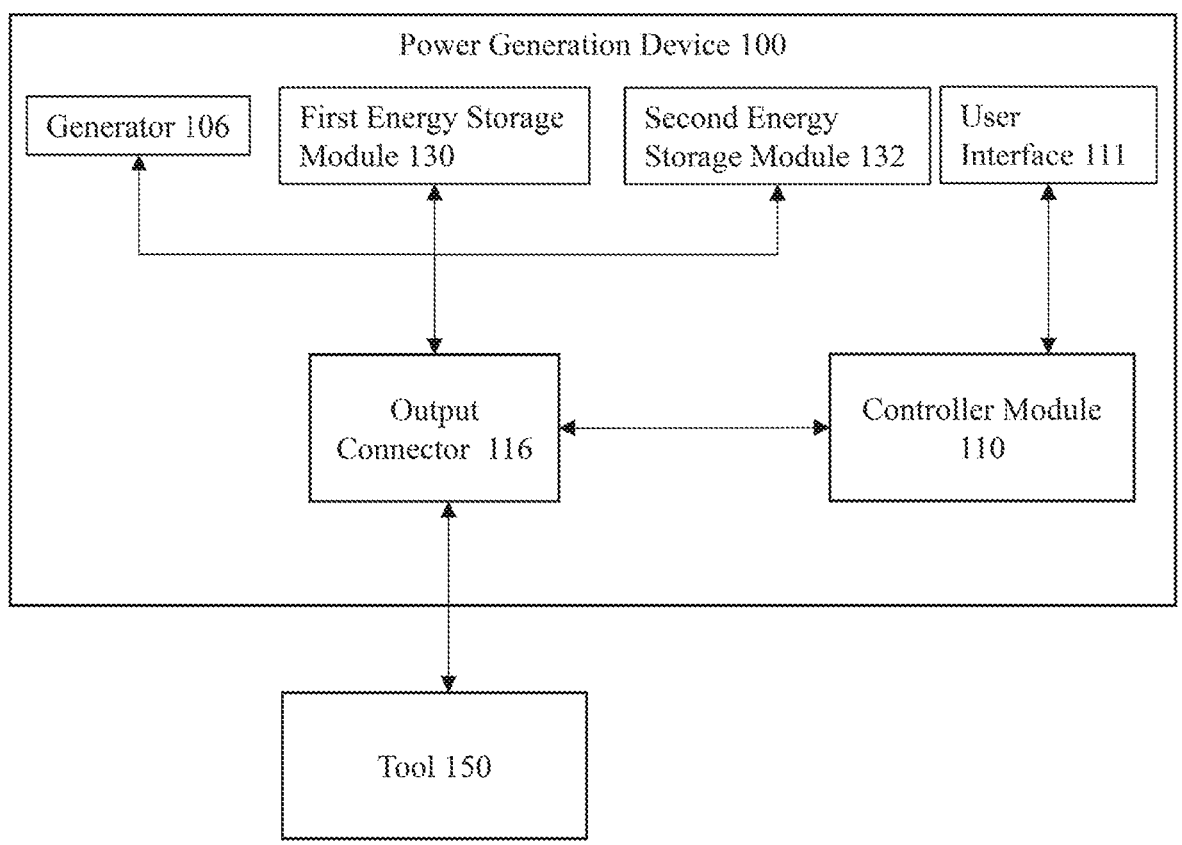
FIG. 24 is a diagram illustrating connection of a tool to a power generation device, according to any of the embodiments described herein.

The external device may be, for example, a smart phone. This may allow the smart phone to be used as an emergency signal device, as described herein. Alternatively, as shown in FIG. 24, the external device may be a tool 150. The tool 150 may be, for example, a flashlight (such as an LED flashlight or a UV flashlight), a lantern, a reading lamp, a bright strobe light, an emergency flasher, a Morse code flasher, a fire-starter, a siren, a directional sound amplifier, a speaker system, an ultrasonic dog whistle, a cell phone charger, a cell phone signal booster, a satellite phone charger, a mesh networking radio (such as the GOTENNA PRO mesh networking radio supplied by goTenna, Inc.), a range finder, a radio (e.g., AM/FM/weather), an air pump, a water purifier, an electronic compass, a stun gun, a hand/body warmer, or a fan.

The tool 150 may be connected to power generation device 100 using a cable, such as a USB cable (e.g., USB cable 119). Alternatively, the tool 150 may connect directly to the output connector 116. For example, the output connector 116 may include a bayonet style connector such as those sold by the Amphenol Corporation of Wallingford, Conn. In some embodiments, output connector 116 is integrated into cap 117. When connected to power generation device 100 via output connector 116, the tool 150 can be controlled via user interface 111. For example, the user interface 111 can be used to turn the tool 150 on and off In some embodiments, user interface 111 can be used to change the operational settings of the tool 150. In addition, in some embodiments, certain functions of the tool 150 are automatically controlled by controller module 110.

In addition, the tool 150 can receive power from the power generation device 100 via the output connector 116. In various embodiments, the tool 150 can receive power directly from the generator 106 or, alternatively, from energy storage modules 130, 132 (described below).

Because the power generation device 100 provides the electricity to operate the tool 150 and user interface 111 and controller module 110 are used to control the tool 150, the tool 150 itself may be compact and lightweight. For example, the tool 150 may be a flashlight and include LED bulbs, limited circuitry, and a housing. The compact and lightweight nature of the tools, and the fact that the power generation device 100 can be configured to connect to a variety of tools in a modular fashion, may allow a user to carry a number of different tools without being burdened by the excessive weight that would be introduced if each tool required its own battery and control systems. This is a significant advantage when camping and hiking.

Figure 12:
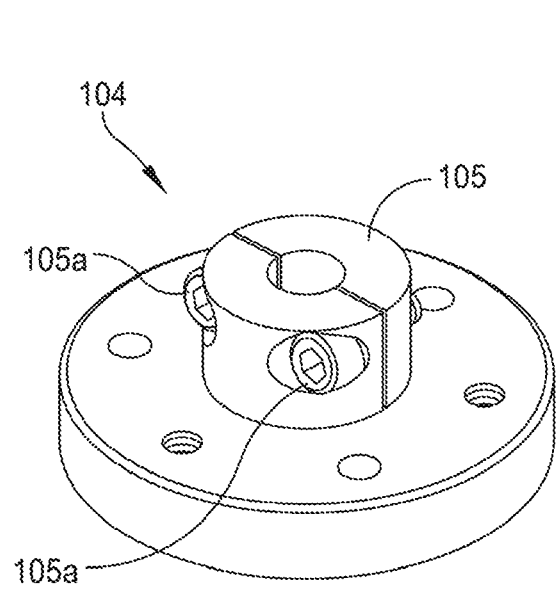
FIG. 12 shows a perspective view of a hub, according to one embodiment described herein.
Figure 13:
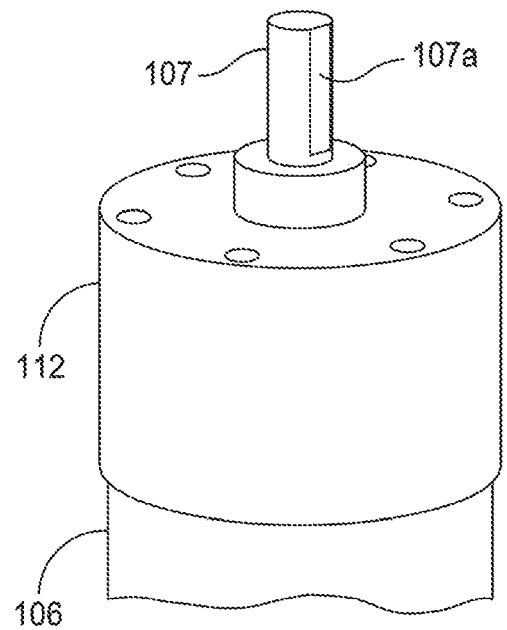
FIG. 13 shows a perspective view of a generator and gearbox assembly, according to one embodiment described herein.
Figure 14:
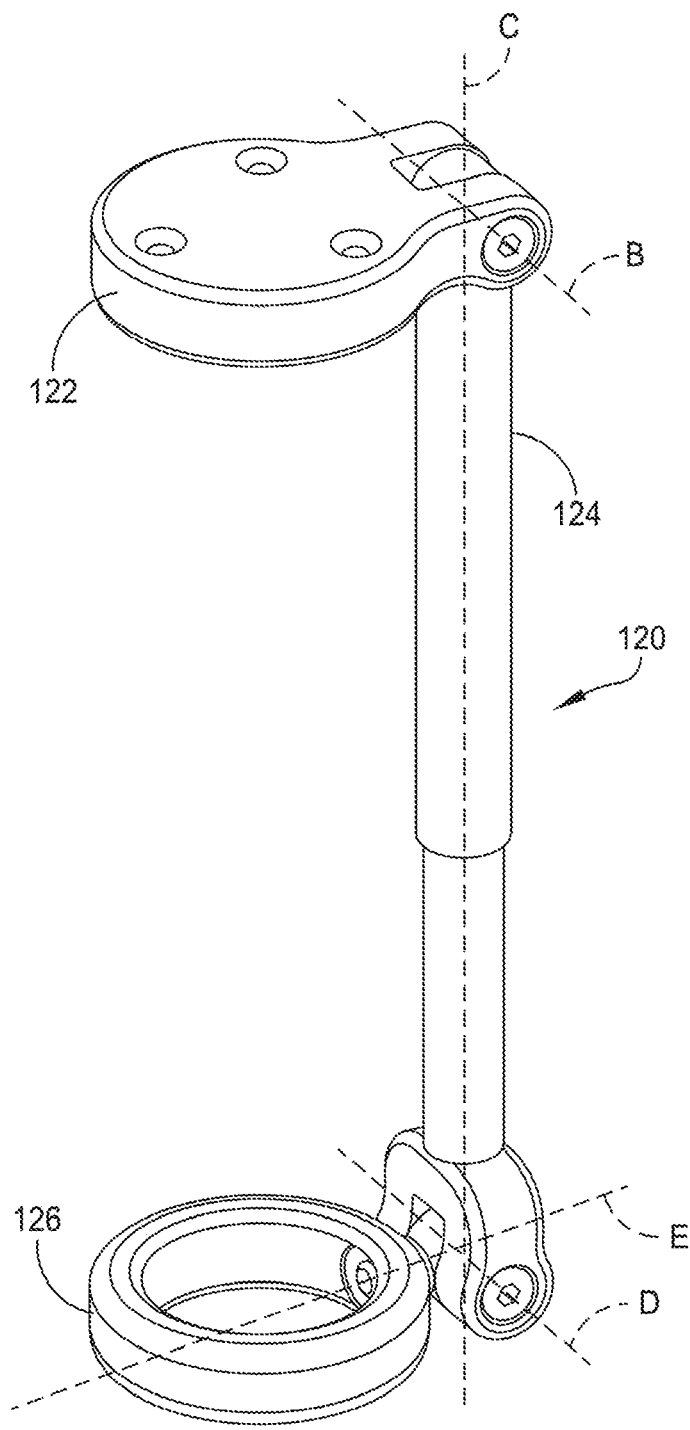
FIG. 14 shows a perspective view of an arm assembly, according to one embodiment described herein.
Figure 15:
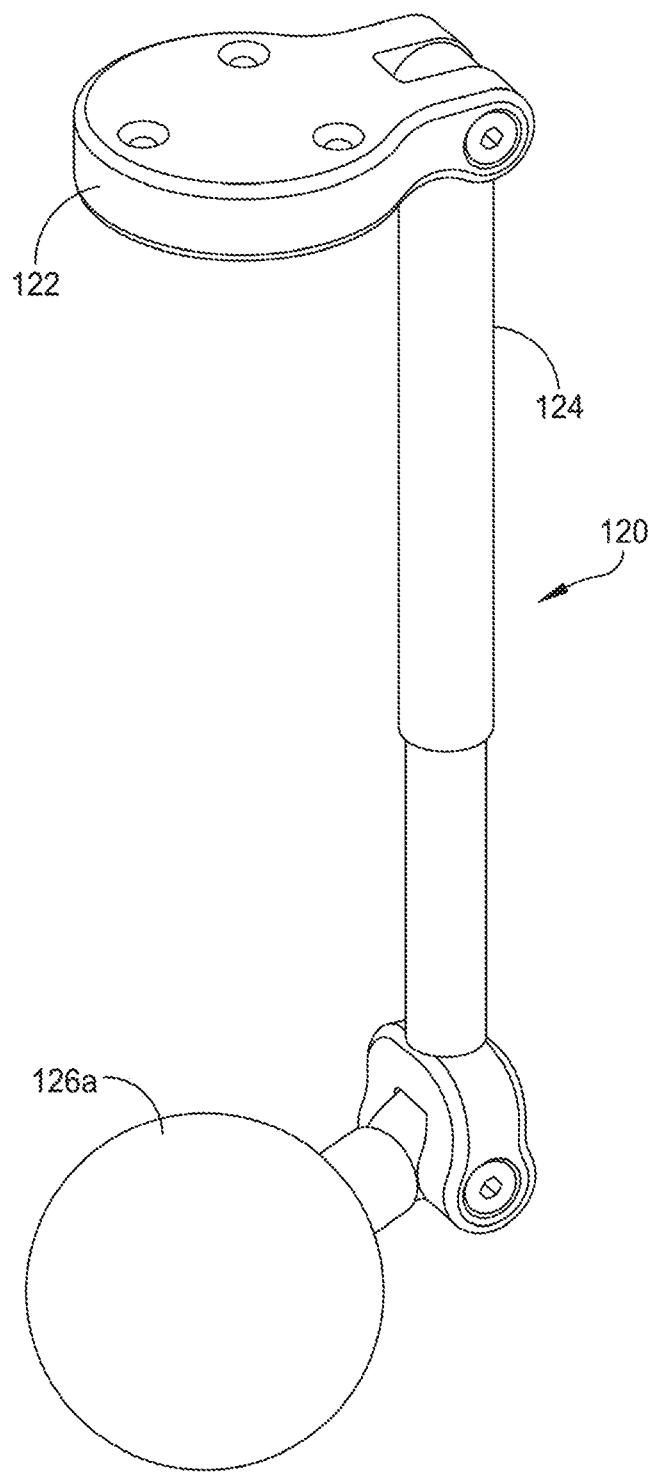
FIG. 15 shows a perspective view of an arm assembly, according to another embodiment described herein.

The power generation device 100 can include one or more attachments for rotating the hub 104. For example, as shown in FIGS. 1-9, an arm 120 can be connected to the hub 104 via a coupling 122. The coupling 122 may connect to the hub 104 in any appropriate manner. For example, as shown in FIGS. 12 and 14, each of the hub 104 and coupling 122 may include fastener holes configured to align such that fasteners may be used to couple the coupling 122 to the hub 104. As shown in FIG. 14, the arm 120 has a first end 120a and a second end 120b, with a shaft 124 extending therebetween. At the first end 120a, the shaft 124 is connected to the coupling 122. The shaft 124 may be connected to the coupling 122 in any appropriate manner. As shown, for example, in FIG. 14, a clevis-type connection may be used. At the second end 120b, the extension is connected to a knob 126. The shaft 124 may be connected to the knob 126 in any appropriate manner (e.g., a clevis-type connection). The knob 126 can be any appropriate shape and size and, in one embodiment, is configured to be ergonomically manipulated by a user. For example, the knob 126 can include a spherical or semi-spherical portion 126a for manipulation by a user, as shown in FIG. 15. In other embodiments, as shown, for example, in FIG. 1A, the knob 126 is in the form of a ring. The mass of the knob 126 can also be chosen to provide a desired rotational momentum during use, as is described further herein.

The coupling 122 is configured to allow the arm 120 to pivot with respect to the hub 104 about an axis B (shown in FIG. 14) that is, at least in some embodiments, radially offset from the central longitudinal axis A and transverse thereto. In some embodiments, axis B is tangent to a circle centered on axis A. In one embodiment, the axis B lies in a plane that is orthogonal to axis A. In another embodiment, the axis B lies in a plane that is at a non-orthogonal angle with axis A. In some embodiments, the range of motion of the arm 120 about axis B may be limited. For example, in some embodiments, the arm 120 may only be able to pivot up to 180° about axis B (i.e., from the downward vertical position shown in FIGS. 4 and 5 to an upward vertical position). In other embodiments, the arm 120 may only be able to rotate up to about 120° from the downward vertical position.

In addition to allowing the arm 120 to pivot about axis B during use, the coupling 122 also allows the arm 120 to be positioned such that it is approximately parallel with the longitudinal axis A. This allows the arm 120 to be compactly stored when not in use, as shown in FIGS. 2-5.

The knob 126 can also be configured to rotate about one or more axes. In one embodiment, the knob 126 is able to rotate about axis C (shown in FIG. 14). Axis C can be coincident with a longitudinal axis of the shaft 124. Alternatively, axis C can define an angle with respect to a longitudinal axis of the shaft 124. In one embodiment, the angle is between 0 degrees and 45 degrees. In another embodiment, the angle is between 0 degrees and 30 degrees. In another embodiment, the angle is between 0 degrees and 15 degrees. In another embodiment, the angle is between 0 degrees and 10 degrees.

Figure 6:
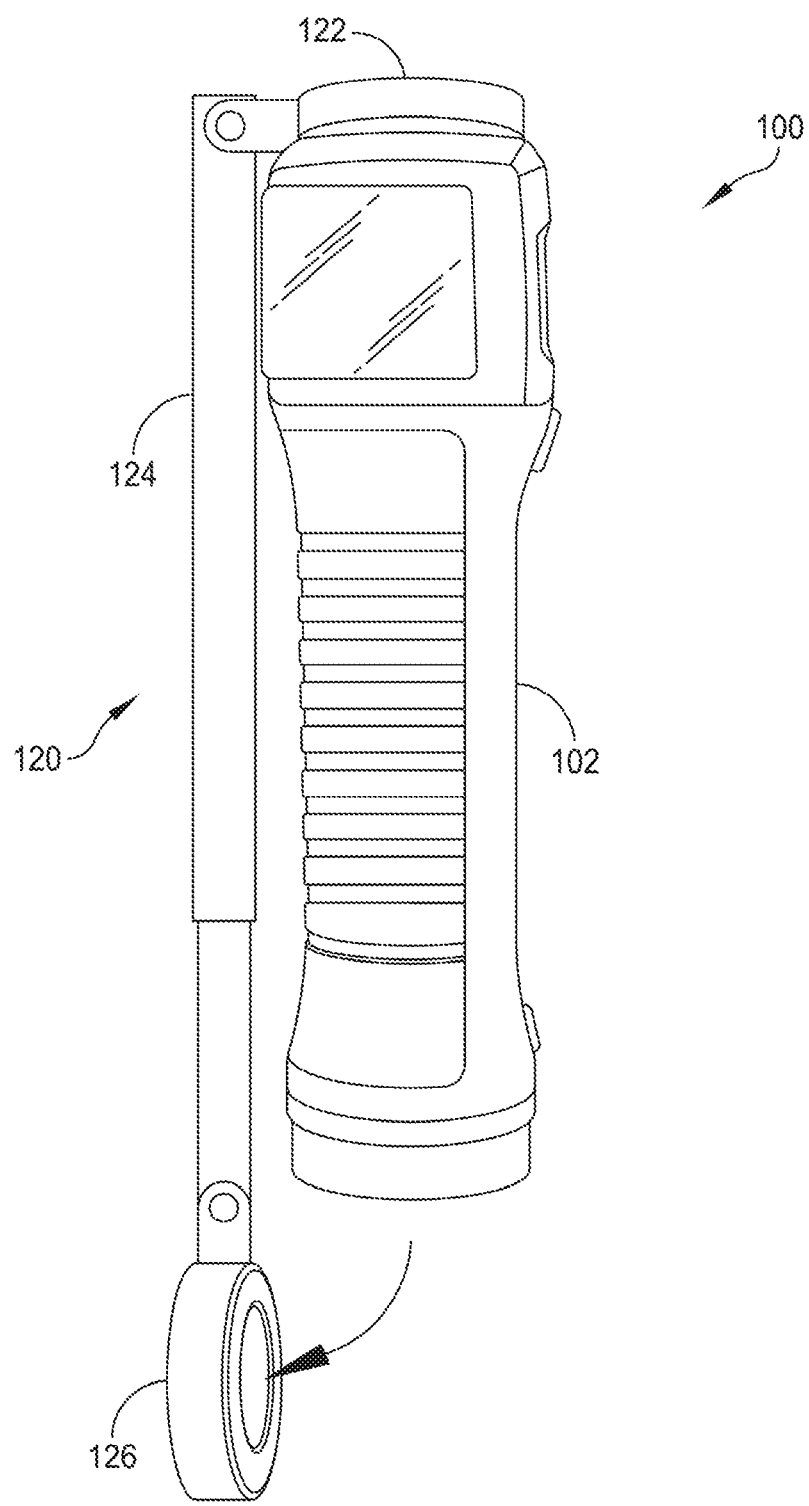
FIG. 6 shows a left side view of the power generation device of FIG. 1A with the knob disengaged from the body.

Additionally, or alternatively, the knob 126 can also rotate about axis D (shown in FIG. 14). Axis D can be oriented orthogonally with a longitudinal axis of the shaft 124 (e.g., axis C). In some embodiments, axis D is parallel to axis B. As shown, for example, in FIGS. 4 and 5, when in the storage position, the knob 126 may engage the cap 117 to retain the knob 126 and arm 120 in the storage position. In order to begin using the power generation device 100, the user may disengage the knob 126 from the cap 117 by rotating the knob 126 about axis D as shown in FIG. 6. In some embodiments, the power generation device 100 includes a retainer 142 (shown in FIG. 1A) for retaining the knob 126 in the storage position. For example, the retainer 142 may include flex arms that engage the inside of the knob 126 to hold the knob 126 in place. In some embodiments, the retainer 142 may removably engage the output connector 116.

Additionally, or alternatively, the knob 126 can also rotate about an axis E (shown in FIG. 14). Axis E may be orthogonal to axis D. Axis E may further align with a diameter of the knob 126. The degrees of freedom that the various axes of rotation provide make rotation of the arm 120 more comfortable for the user, as described herein.

Figure 7:
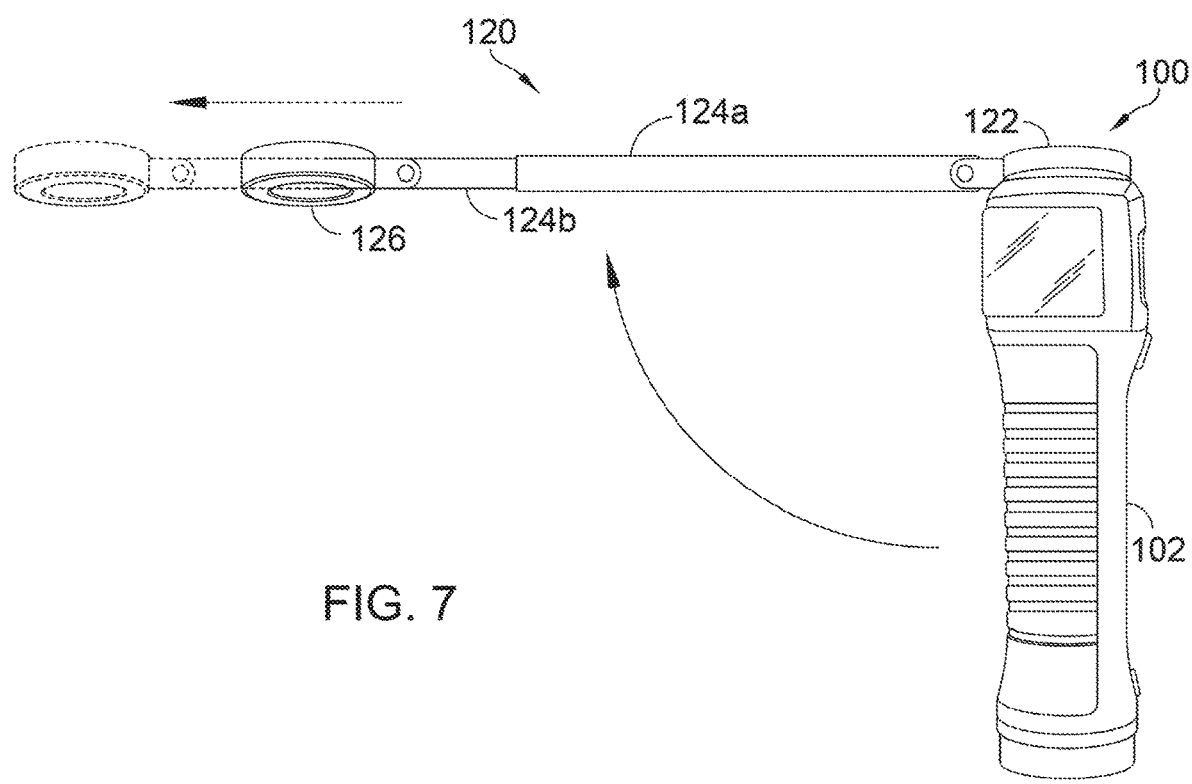
FIG. 7 shows a left side view of the power generation device of FIG. 1A with the arm pivoted upward and extending from a first length to a second length.

In various embodiments, the length of the arm 120 can be adjusted, as shown in FIG. 7, either automatically or manually. For example, the shaft 124 may include a first shaft 124a and a second shaft 124b that are configured to telescope with respect to one another. The shafts 124a, 124b may form a slip-fit. Alternatively, the shafts 124a, 124b can have complementary threaded portions. Although only two shafts are illustrated, any number of shafts may be used to provide the desired length of the shaft 124. In various embodiments, the arm 120 can be configured to extend from the collapsed configuration to the extended configuration in response to centrifugal forces created by rotating the arm 120 about the body 102. In other embodiments, the length of the arm 120 is adjusted manually prior to use. In some embodiments, the arm 120 is biased to retract. For example, the arm 120 can include a spring configured to retract second shaft 124b. In this way, the arm 120 may be retracted when power generation device 100 is not in use or when the centrifugal force decreases.

With the arm 120 connected to the hub 104, the power generation device 100 can be operated in either of two modes, a twirling mode or a cranking mode. As shown in FIG. 8, in the twirling mode, the user grasps the body 102 and rotates her wrist, similar to the motion used when jumping rope. As the user rotates her wrist, the arm 120 rotates around the body 102, thereby causing rotation of the hub 104 and the rotor of the generator 106. The knob 126 acts as a weight at the end of the arm 120. As the rate of rotation of the arm 120 increases, the arm 120 may extend such that the knob 126 is further from the body 102. This results in an increase in the angular momentum of the arm 120. As will be described in further detail below, as the angular momentum of the arm 120 increases, the controller module 110 can increase the rotational resistance of the rotor to increase the amount of electrical output. The weight of the knob 126 can be configured to provide the desired momentum when the arm 120 is rotated. For example, in one embodiment, the knob 126 has a mass of about 20 grams or more. In another embodiment, the knob 126 has a mass of about 70 grams. In another embodiment, the knob has a mass of between about 20 grams and about 70 grams.

Figure 9:
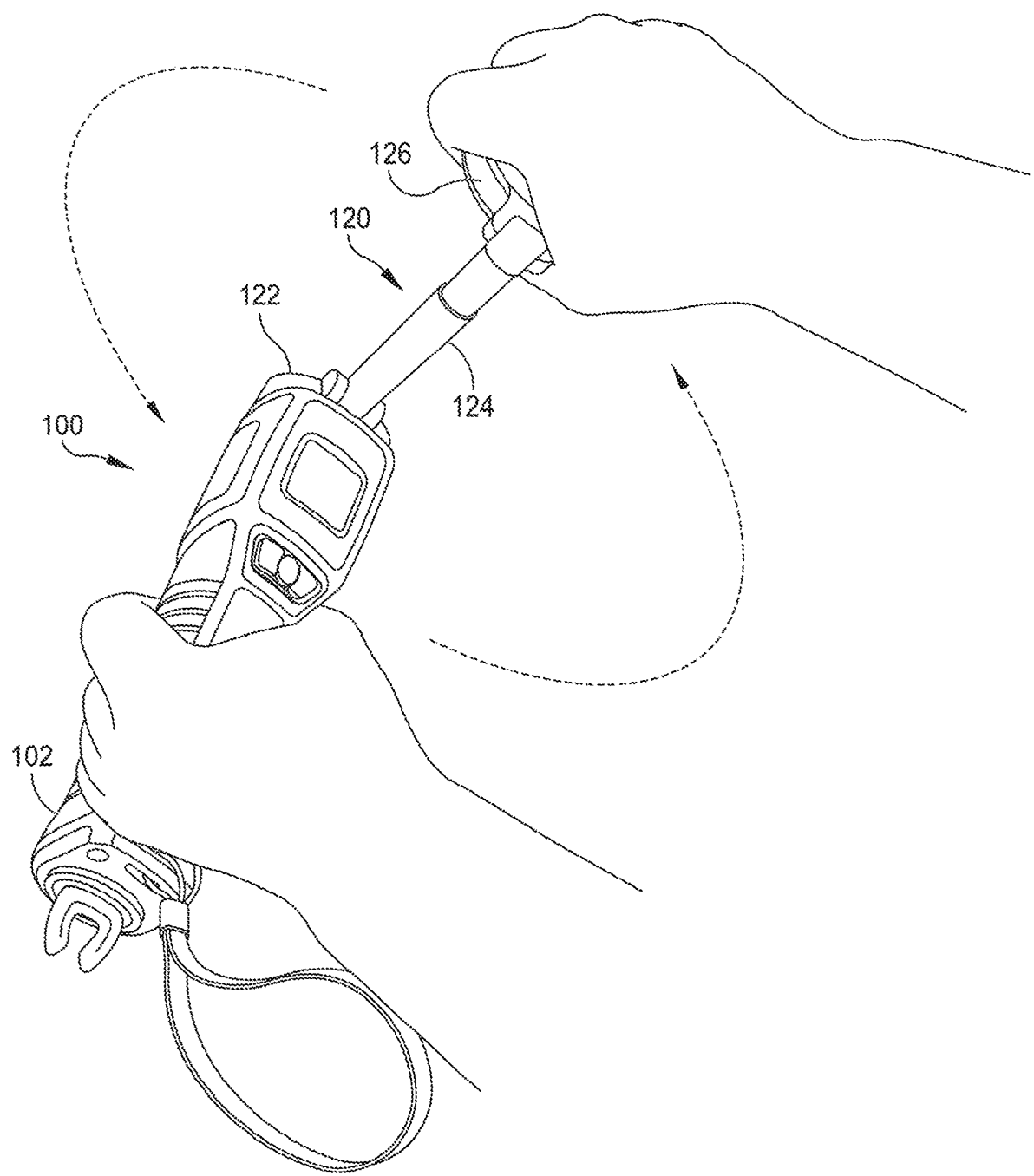
FIG. 9 shows the power generation device of FIG. 1A in a cranking mode of operation.

As shown in FIG. 9, when using the power generation device 100 in the cranking mode, the user grasps the body 102 with one hand and the knob 126 with the other. Alternatively, the user can secure the body 102 to an object, as described above, to allow operation with only one hand. The user then rotates the arm 120 around the body 102 to, thereby, rotate the hub 104. Rotation of the hub 104 causes rotation of the rotor of the generator to generate electrical power. By providing multiple axes of rotation between the body 102 and the knob 126, the knob 126 can be more comfortably manipulated, particularly in the cranking mode. Prior art hand-powered generators require the user to move their hand in a flat circular plane. In contrast, the power generation device 100 described herein allows for a more natural motion when cranking the arm. This allows the larger muscles of the forearm and upper arm to provide the force for cranking the arm 120. As a result, the power generation device 100 can be operated for a longer period of time with less discomfort. In addition, as will be described further herein, the resistance of the generator 106 can be adjusted. This allows the user to produce a larger amount of electrical output.

In addition, as described above, the arm 120 can be of variable length. The length of the arm 120 can be adjusted to optimize the length for either the cranking or twirling modes of operation. For example, it may be preferable for the arm 120 to be longer when the generator 106 is used in the twirling mode. This may allow the generator 106 to be more easily started and provide increased angular momentum of the arm 120. In one embodiment, the length of the arm 120 can be varied between about 50 mm and about 200 mm.

In addition, the shaft 124 of the arm 120 can be flexible in one or more directions. This may allow the shaft 124 to be rolled in order to change the length of the arm 120.

The effective resistance to the rotation of the hub 104 and, thereby, the arm 120 can be adjusted to enhance both the comfort of the device and the rate of electrical output. In one embodiment, the resistance to rotation is adjusted manually. In one embodiment, the generator has discrete resistance settings, such as a high resistance setting and a low resistance setting.

In some embodiments the gear ratio between the rotation of the hub 104 and the rotor may be changed to achieve discrete changes in the resistance (e.g., by selectively engaging and disengaging certain gears). In other embodiments, the resistance is adjusted across a continuous range. Such an embodiment can utilize variable resistance of the generator 106 to resist rotation of the rotor. For example, the controller module 110 can control the load on the generator 106 as will be described in more detail herein.

In some embodiments, the resistance is varied automatically. For example, in response to the hub 104 rotating at a specified rate, the controller module 110 can increase the resistance so that the electricity generated for the same speed of rotation increases. This ability to change rotational resistance may be particularly important in the cranking mode.

Figure 2:
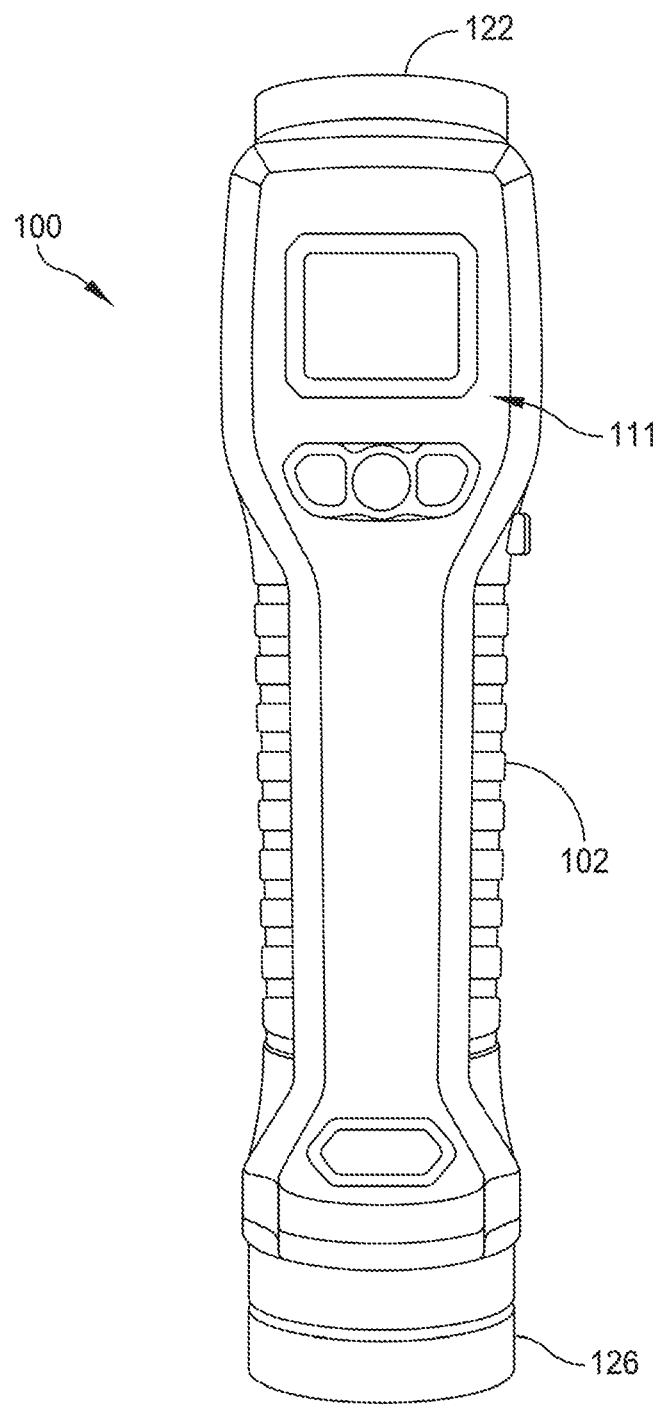
FIG. 2 shows a front view of the power generation device of FIG. 1A.
Figure 3:
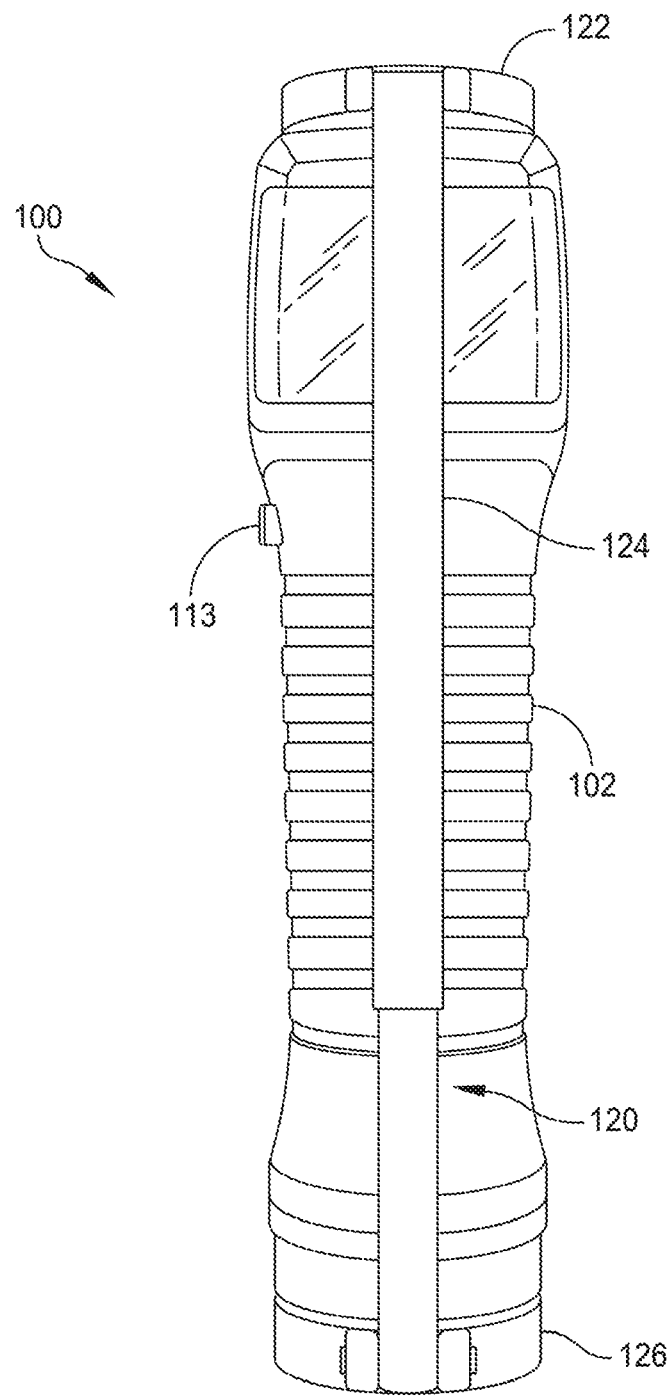
FIG. 3 shows a rear view of the power generation device of FIG. 1A.
Figure 4:
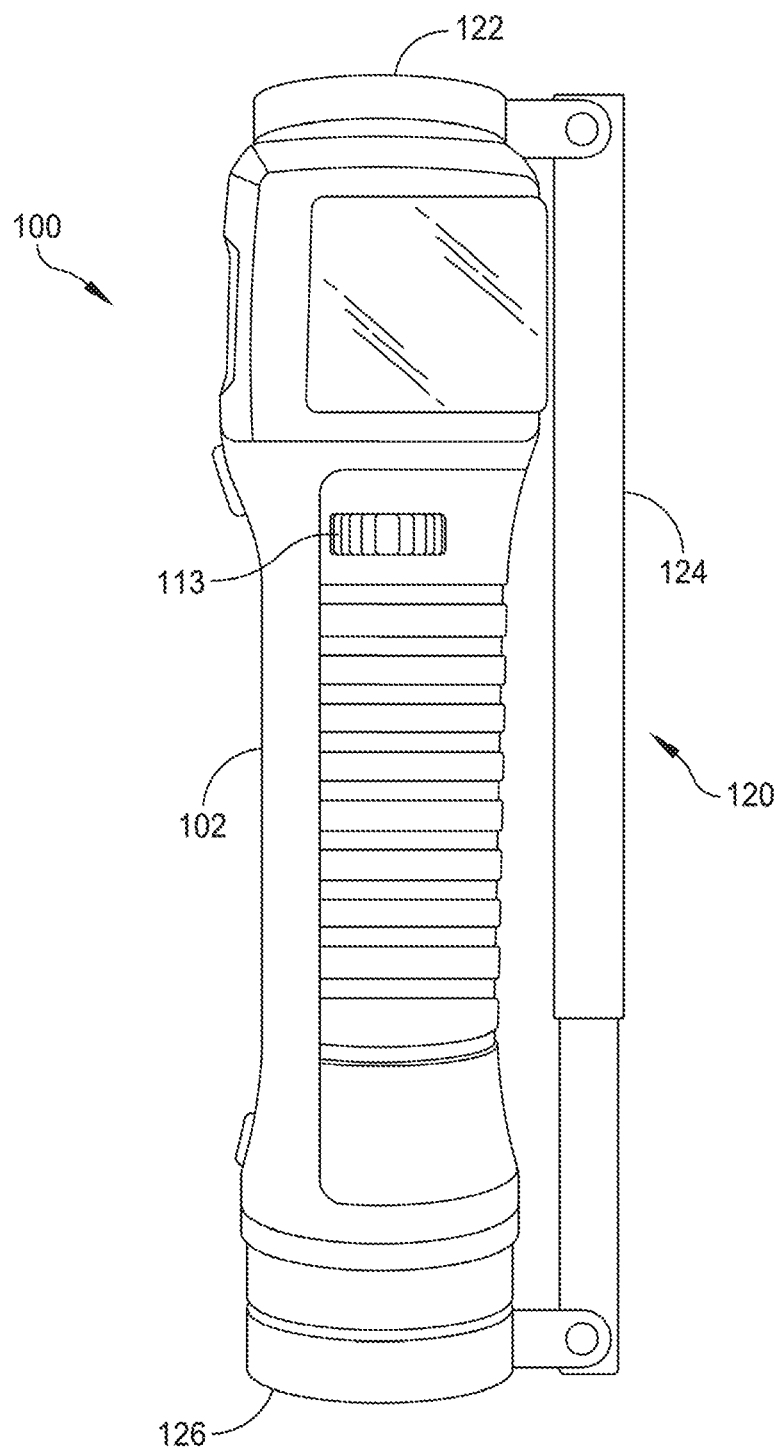
FIG. 4 shows a right side view of the power generation device of FIG. 1A.
Figure 5:
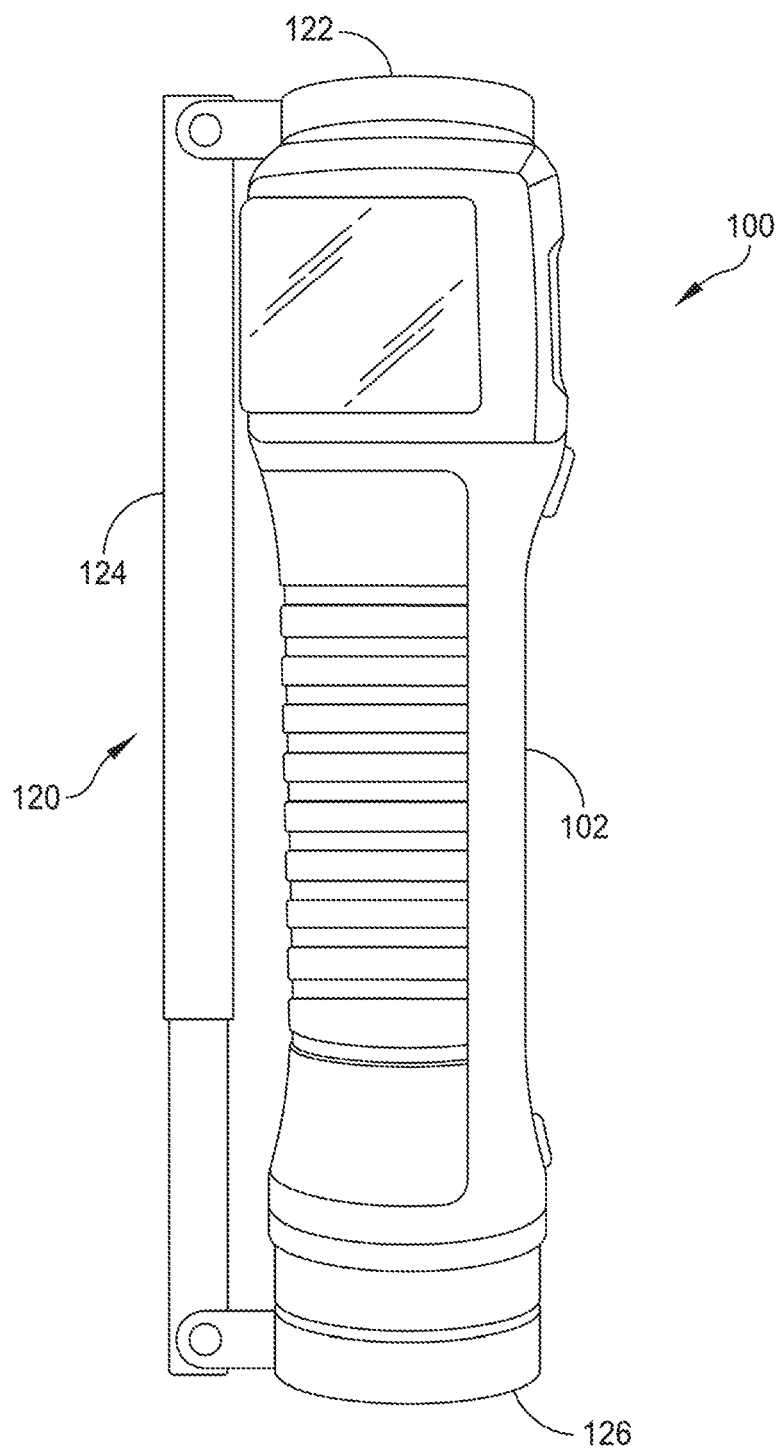
FIG. 5 shows a left side view of the power generation device of FIG. 1A.

In another embodiment, the power generation device 100 can include a user interface that allows the user to adjust the resistance and electrical output of the device. For example, the user interface can include a button, switch, knob, or touch-screen input. For example, a resistance adjuster 113 may be provided on the side of the body 102, as shown in FIGS. 2-4, to allow the user to adjust the resistance. The resistance adjuster 113 may be, for example, a switch allowing the resistance to be switched between two discrete values. Alternatively, resistance adjuster 113 may allow one of a plurality of resistance settings to be selected or for the resistance to be continuously adjusted. For example, in some embodiments, resistance adjuster 113 is a wheel that allows the resistance to continuously adjusted.

In another embodiment, the resistance can be adjusted by the user via an external device, such as a smartphone. The external device can be connected to the controller module 110 of the generator via any appropriate communication method, for example, Bluetooth, Bluetooth Low Energy, or Wi-Fi. The external device can include a program (e.g., an application) that allows the user to set the desired resistance and electrical output.

While the embodiment shown in FIGS. 1-9 illustrates the hub 104 rotating about a longitudinal axis of the body 102, the hub 104 can also rotate about another axis through appropriate use of gearing or other power transfer mechanisms. For example, the power generation device 100 can utilize a bevel gear to create an angle between the axis of rotation of the hub 104 and the rotor. The bevel gear can be any appropriate configuration, for example, a straight bevel gear, a spiral bevel gear, a zerol bevel gear, or a hypoid bevel gear. In one embodiment, the axis of rotation of the hub 104 is perpendicular to the axis of rotation of the rotor.

In some embodiments, the axis of rotation of the hub 104 is adjustable from a first angle to a second angle. In response to adjustment of the axis of rotation of the hub 104, the rotational resistance of the generator 106 can be automatically adjusted. This adjustment may be the result of a change in gear ratio between the hub 104 and the rotor. Alternatively, the electrical resistance of the generator 106 can be automatically adjusted in response to the change in position of the hub 104.

In one embodiment, the hub 104 can be configured to act as a flywheel and continue rotating until the rotational momentum of the hub is exhausted.

In addition to the arm 120, the power generation device 100 can be coupled to a variety of other driving devices. In one embodiment, the driving devices can be interchangeable. In such embodiments, the driving devices can be releasably coupled to the hub 104. For example, coupling 122 may be removed from the hub 104 to allow the alternative driving devices to be coupled to hub 104. In some embodiments, the driving devices may be coupled to the hub 104 using fasteners (e.g., screws). In other embodiments, the driving devices may include a collar that allows the driving devices to be coupled to, and uncoupled from, the hub 104 by, for example, turning the driving device about the longitudinal axis A (e.g., a quarter turn). For example, a bayonet coupling may be used to couple and uncouple the driving devices from the hub 104. Alternatively, the hub 104 can be releasably coupled to the shaft 107 such that the individual driving devices can be releasably coupled to the shaft 107.

For example, one driving device can include a propeller that rotates in response to wind and air movement. Alternatively, the driving device can be similar to that used on anemometers and include a plurality of hemispherical cups. In such embodiments, the power generation device 100 can be held or positioned in the wind to cause rotation of the driving device and rotor to create electrical power. Additionally, or alternatively, the driving device can be held in water, with the movement of the water causing rotation of the driving device. In such an embodiment, the body 102 can be water resistant to protect the internal components of the power generation device 100 from the water. In various embodiments, the propeller or anemometer may rotate about an axis that is transverse to longitudinal axis A using appropriate gearing, as described above. Further, the orientation of such driving devices with respect to the body 102 may be adjustable, manually or automatically, to orient the driving devices appropriately for the direction of wind or water flow.

In another embodiment, the driving device includes a pull-cord which, when pulled, causes rotation of the hub 104. After being pulled, the pull-cord retracts such that it can be pulled repeatedly. The motion can be similar to a lawn mower starting system. In such an embodiment, the body 102 can be held between the user's foot and the ground, allowing for a long pull of the pull-cord and an associated significant rotation of the hub 104. In at least one embodiment, the pull-cord can be fixed in an at least partially deployed position and used in the twirling mode described above.

In other embodiments, the rotation of the hub 104 may be coupled to a foot pedal. In such embodiments, the power generation device 100 may operate similar to a treadle. This may allow the user to use substantially her entire body weight to operate the device. This may allow more electrical output to be generated.

In another embodiment, the rotation of the hub 104 may be coupled to a suspended basket. In such embodiments, as the basket falls, the descent causes the hub 104 to rotate.

Figure 16:
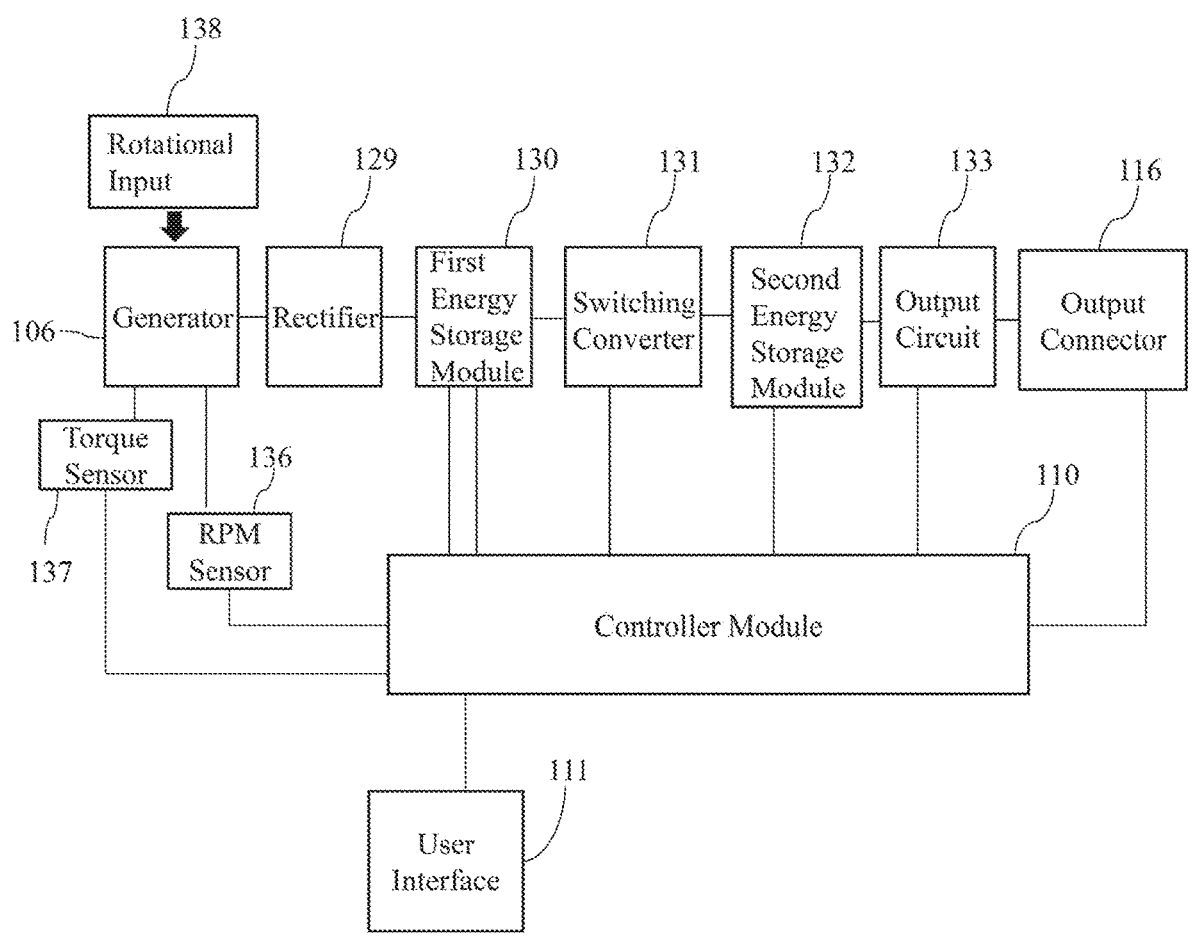
FIG. 16 is a diagram of a generator and control system, according to one embodiment.

In one embodiment, the power generation device 100 includes an internal battery (e.g., first energy storage module 130 or second energy storage model 132 shown in FIG. 16). In such an embodiment, the internal battery is charged by the generator 106 when the rotor is rotated. As a result, the external device 118 need not be connected to the generator 106 during rotation of the hub 104. Instead, the internal battery is charged by the generator 106 and the external device 118 can later be connected to the generator 106 to charge at the desired time. For example, this may allow the user to charge the internal battery overnight by mounting the power generation device 100 to a tree with a turbine or anemometer attached. This can charge the internal battery such that the external device can be used during the day. In some embodiments, the power generation device 100 includes a solar cell such that the internal battery may be charged using solar energy.

In various embodiments, if the internal battery is incapable of holding a charge the internal battery may be bypassed and all electrical output of the generator 106 may be directed to the output connector 116.

The power generation device 100 can also include one or more meters or sensors to provide feedback to the user. For example, the power generation device 100 can include a meter that measures and displays the number of rotations of the hub 104 and/or the rotor of the generator 106, the energy being generated by the generator 106, the charge status of the internal battery, or any other appropriate metric. The measured value of the meters or sensors can be displayed, for example, on a display, such as an LED display on the body 102. Alternatively, or additionally, the values recorded by the meters or sensors can be displayed mechanically, such as on a dial.

The electrical and control systems of the power generation device 100 are shown in more detail in FIGS. 16-21. FIG. 16 shows the control and power flow of the power generation device 100. As described above, the rotational input 138 can come from human hand cranking, human tether spinning, wind propeller, or other driving device of the power generation device 100. The rotational torque and/or speed from these types of power sources may not be constant. As such, the power generation device 100 preferably includes a controller module 110 that will maximize a chosen system operating parameter in response to the present torque and/or speed conditions. In some embodiments, it is desirable to optimize parameter(s), such as torque at input, rotational speed, maximum power generated over a time interval, maximum energy transferred in a time interval, or the power transfer (for example by operating at the maximum power point utilizing algorithms like the Maximum Power Point Tracking algorithm). In one embodiment, optimization is accomplished by setting an operating point for a parameter, and controlling generator loading using pulse width modulation (PWM) driven switching MOSFETS to maintain operation around the chosen setting. This operating point setting may remain stationary, or may be time varying in response to other system variables. Optimization may also mean employing an AI algorithm to learn human physical exhaustion and recovery curves for a particular human operator of the generator and dynamically adjusting operating points to maintain human endurance during operation while optimizing energy transfer, dynamic power level or operating time of the human operator.

In one embodiment, the generator 106 can be operated in a manual mode where the user can set a desired input torque level by adjusting a user interface element (e.g., resistance adjuster 113) such as a sliding bar, for example. The position of the sliding bar is sensed by the controller module 110, and the percent "on" time for the PWM signal sent to a switching converter 131 will be increased or decreased to increase or decrease the cranking effort, respectively. In this manner, the user can select (and modify during use) settings that feel comfortable for prolonged periods of cranking the power generation device 100.

The generator 106 can be any appropriate type. For example, in one embodiment, the generator 106 is a permanent magnet (PM) DC generator, either with brushes or brushless (BLDC). In another embodiment, the generator 106 is implemented from a unit primarily designed as a motor, either with or without brushes. In another embodiment, the generator 106 is a DC generator with field coils and no permanent magnets. In another embodiment, the generator 106 is an AC generator (or motor) with single phase output or three phase output.

Figure 17:
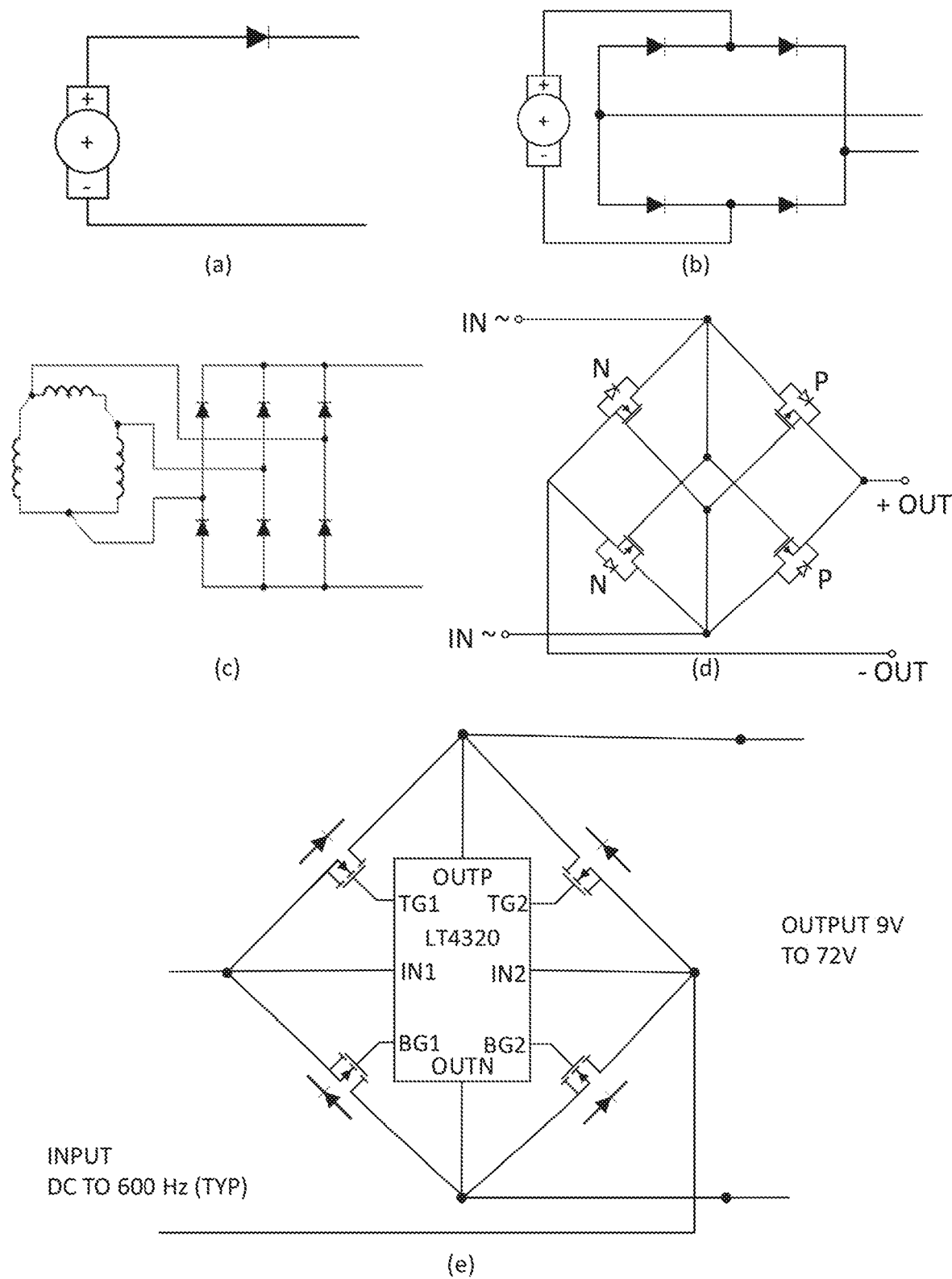
FIG. 17 shows embodiments of a rectifier of a power generation device, according to at least one embodiment.

As shown in FIG. 16, the power generation device 100 can also include a rectifier 129. The rectifier 129 can be chosen to match the generator type. For example, the rectifier 129 can be a single blocking diode, a four diode bridge rectifier, or a three phase six diode configuration. In other embodiments, the rectifier 129 can be an active rectifier with solid state switching to reduce the power losses from diodes. By using solid state switches such as MOSFETS, the voltage drop across the rectifying component is reduced, thus reducing the power dissipation of this element. FIG. 17 shows several embodiments of diode rectification that can be used in the power generation device 100. FIG. 17*a* shows a blocking diode for an AC or DC generator. FIG. 17*b* shows a bridge rectifier that works with DC or AC generators, and provides proper current direction when a DC generator is cranked backwards. FIG. 17*c* shows a configuration for use with a three phase brushless DC (BLDC) generator (or motor) with three wire output. FIGS. 17*d* and 17*e* show an active rectifier configuration. In other embodiments, any appropriate active rectification is used.

Figure 18:
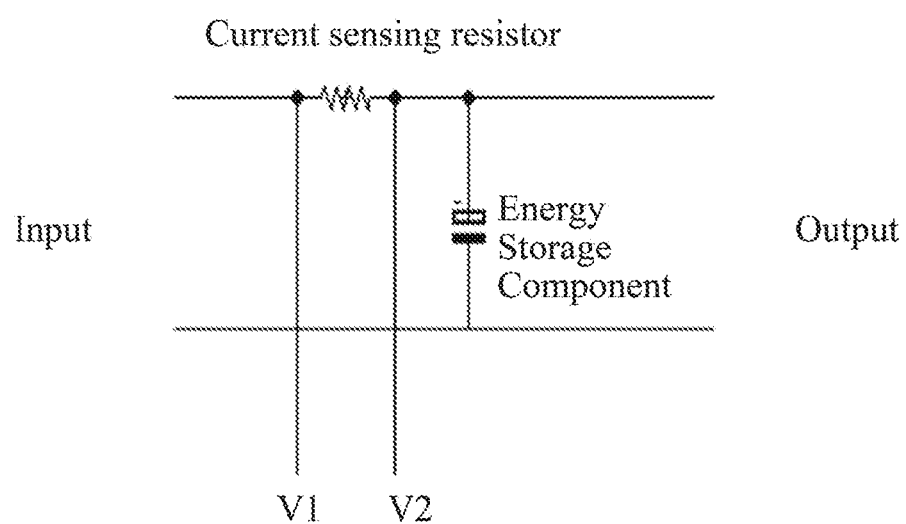
FIG. 18 shows an energy storage module according to one embodiment.
Figure 19:
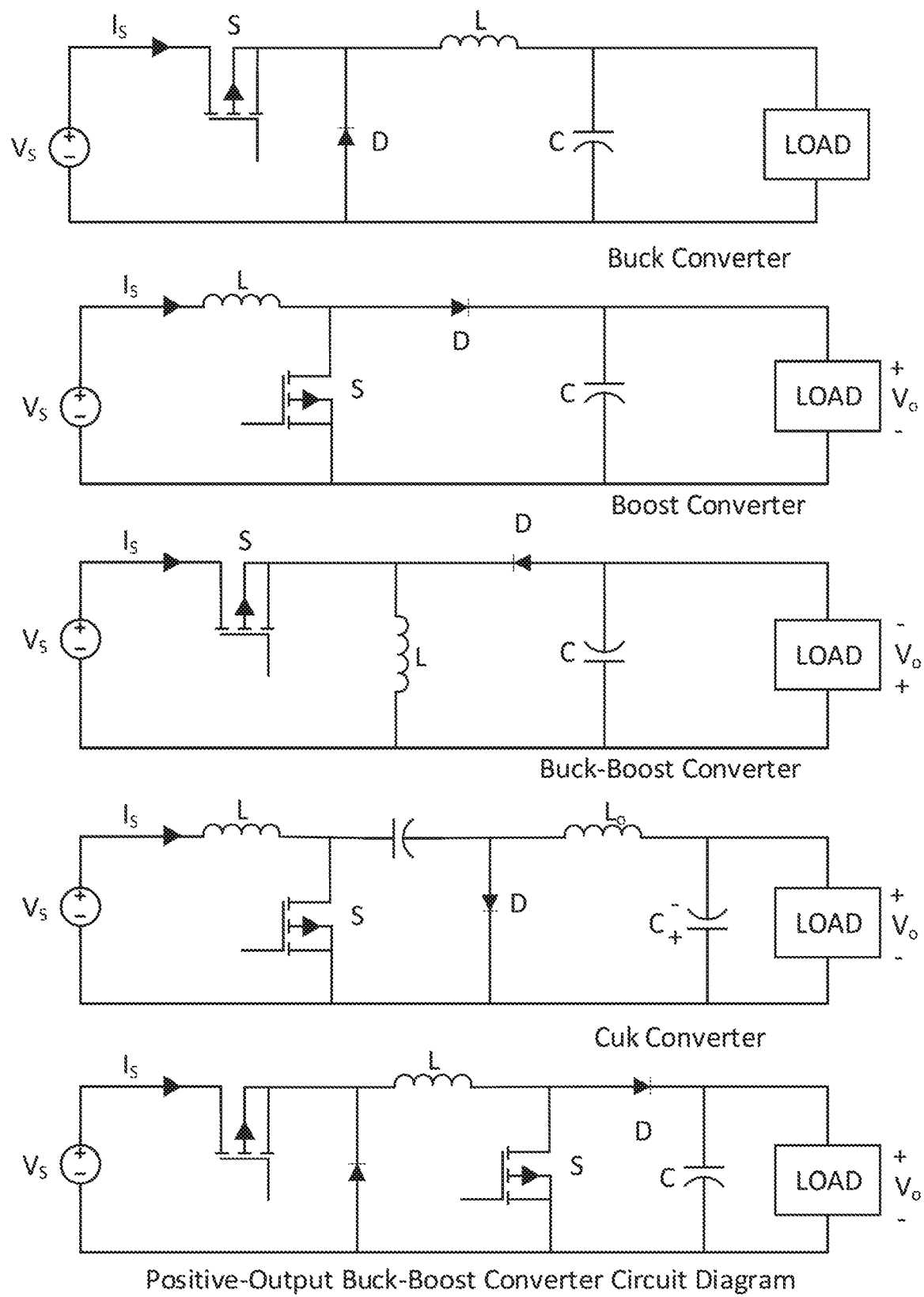
FIG. 19 shows embodiments of an output circuit of a power generation device, according to at least one embodiment.

Returning to FIG. 16, the power generation device 100 can also include a first energy storage module 130. The first energy storage module 130 can include capacitors, supercapacitors, a battery, or any other appropriate energy storage medium. In one embodiment, the first energy storage module 130 includes a capacitor or supercapacitor for intermediate energy storage, adaptable to the peak voltage output of the generator, based on the generator rotational speed. In one embodiment, the first energy storage module 130 performs in a similar manner to the input capacitor on voltage regulator circuits to smooth out periodic or fluctuating voltage from the generator 106 and the rectifier 129 circuit. The first energy storage module 130 can also be used as the energy source for the controller module 110 when the generator 106 is first powered by the user. Voltage and current at the input to the first energy storage module 130 are sensed and measured by the controller module 110 and used in control algorithms for controlling the switching converter 131. FIG. 18 shows one embodiment of the first energy storage module 130 using a current sensing resistor and a capacitor for storage. The sensing voltage outputs, $V_1$ and $V_2$, are used by the controller module 110 to measure voltage and current, and to calculate power flow from the generator 106. In other embodiments, other methods are utilized to sense current flow, such as hall effect sensors or a sense coil. These can be either open loop or closed loop current sensors.

Returning to FIG. 16, the power generation device 100 can further include a switching converter 131. The switching converter 131 can be a boost circuit, a buck circuit, a buck/boost circuit, a Cuk circuit, or any other appropriate circuit. FIG. 12 illustrates certain exemplary embodiments. The active switching element(s) in the switching converter 131 are controlled by the controller module 110. In one embodiment, a pulse width modulated (PWM) closed loop control signal is created by the controller module 110 using the sensed voltage output of the switching converter 131, the torque value from the torque sensor 137, the rotational speed value from the RPM sensor 136, the desired setpoints, and the control algorithm. The torque and speed values can also be derived from virtual sensors based on voltage and current measurements.

The control algorithm also takes as inputs any desired setpoints for torque, speed, voltage output, and human motive effort input. All of these can be dynamic or static. The control algorithm can also provide overcharge protection for the first and/or second energy storage modules 130, 132 by turning off the active switching element(s) of the switching converter 131 when the charge level of the first and/or second energy storage modules 130, 132 is full.

The required torque to drive the generator can be modified independently of the load by adjusting the PWM signal to the switching converter 131's active switching element(s). This allows the load to be set by the PWM signal. This setting can be time varying and include startup conditions, a time-dependent ramp-up, a time-dependent ramp-down, a voltage dependent ramp-up or ramp-down, or any other appropriate operation profile. In one embodiment, on startup, the PWM signal is off (equal to zero), so the amount of effort to turn the generator is minimized. As a result, the effort required to start the generator is low, thereby allowing comfortable start-up by the user. The PWM is gradually increased to require additional force.

The second energy storage module 132, shown in FIG. 16, can include a battery, a supercapacitor, a capacitor, or a combination of these. The voltage of the second energy storage module 132 is measured by the controller module 110 to determine the state of charge, charging requirements, and appropriate settings for the control algorithm. The first 130 and/or second 132 energy storage module can have an auxiliary input circuit such that an external charger (e.g., a USB charger) can be plugged into the power generation device 100 to charge the internal energy storage modules 130, 132 of the external device.

The output circuit 133, shown in FIG. 16, may be configured to provide the desired voltage and current output for a particular charging situation. In one embodiment, 5 volts is provided for use in a USB connection to charge a smart phone or other device. This circuit can also provide short circuit protection or reverse current flow protection. It can also contain a buck, boost, or buck/boost regulator, such as those shown in FIG. 19.

The output connector 116 can be configured as a USB connector, a barrel jack connector, or any other interface that may be appropriate for the user. This connector can be modular in nature and interchangeable with a plurality of connector types. Each output connector 116 module may be associated with code in the controller module 110, indicating connection type and voltage and current output characteristics. The controller module 110 can then control the output circuit 133 to generate the desired voltage and/or current output.

In one embodiment, the controller module 110 includes a programmable microcontroller, interface circuitry for A/D inputs, digital I/O, level shifting, D/A outputs, and any required analog circuitry such as op amp circuits for pre-processing any analog signals (input or output). The controller module 110 interfaces with the user interface 111, and to any sensor modules, such as the torque sensor 137 or the speed sensor 136. The controller module 110 will also contain any voltage regulators required for operation. The power for controller module 110 can be supplied by the first energy storage module 130, the second energy storage module 132, or the output circuit 133.

In one embodiment, the user interface 111, shown in FIG. 1A, includes switches and LEDs. In another embodiment, the user interface 111 includes a GUI screen with touchscreen input. In other embodiments, the user interface 111 includes a combination of these elements.

The RPM sensor 136, shown in FIG. 16, can be an optical encoder, a single LED and detector module, a tachometer coil in or on the generator body, or a virtual sensor. A virtual sensor can be created by calculating the speed from the measured generator output voltage, since the output voltage is directly proportional to speed and related by the generator/motor voltage constant, $K_V$.

$$RPM = K_V * V_g$$

where RPM is the speed, $K_V$ is the voltage constant in rpm/volt, and Vg is the rms generator voltage output.

The torque sensor 137 can be, for example, a piezoelectric element, a resistive bridge, a strain gauge, or a virtual sensor. Torque is directly proportional to current output of the generator.

$$T = K_t * I$$

where T is torque, Kt is the torque constant in Nm/A and I is the generator current output in amps. A virtual sensor can be created by using current measurements and the preceding equation.

Figure 20A:
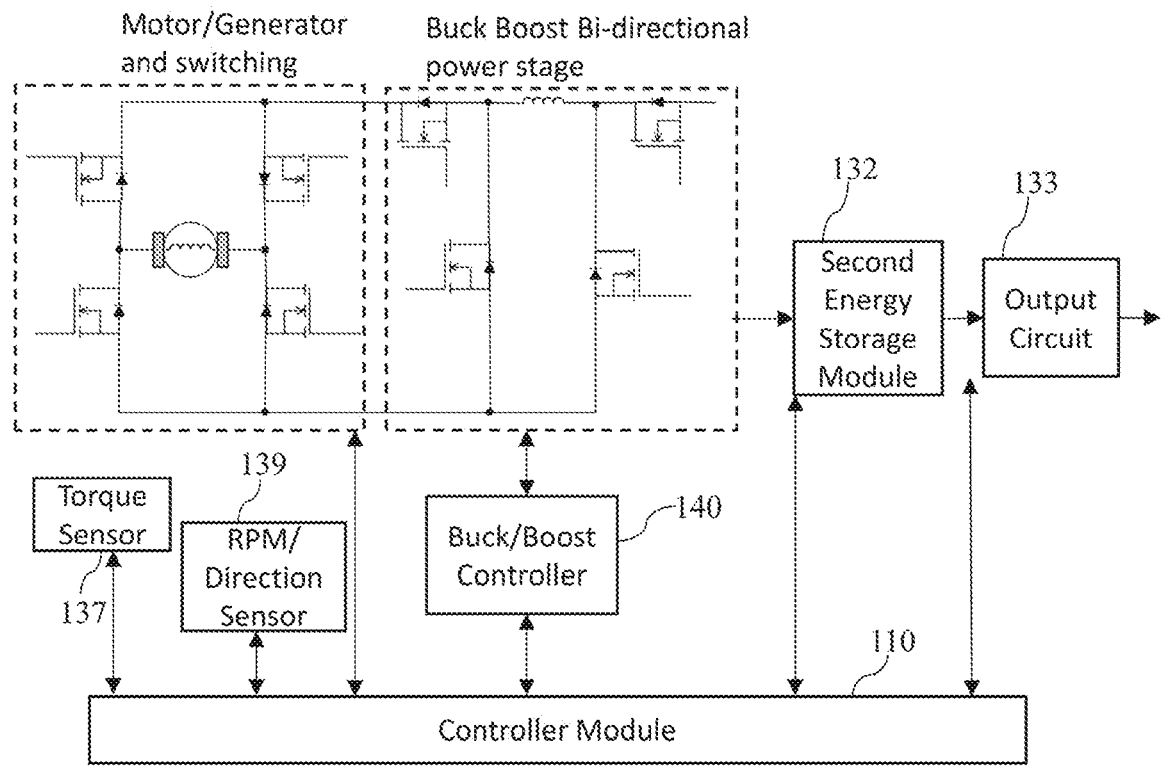
FIGS. 20A and 20B are diagrams of generator and control systems in which the generator is configured to provide a power assisted startup, according to at least one embodiment.

In some embodiments, shown in FIG. 20A, the generator 106 is configured to operate as a motor for a start assist in turning the hub 104 during initial startup of the device, to ease startup for the user. The mosfets shown in FIG. 20A allow connection of power from the bi-directional power stage which is appropriately controlled by the buck/boost controller 140 and controller module 110. The bi-directional buck/boost controller 140 can, for example, be a Texas Instruments BQ25703A. For example, Texas Instruments provides a reference design for using this chip in a bi-directional configuration, shown in FIG. 21.

Figure 20B:
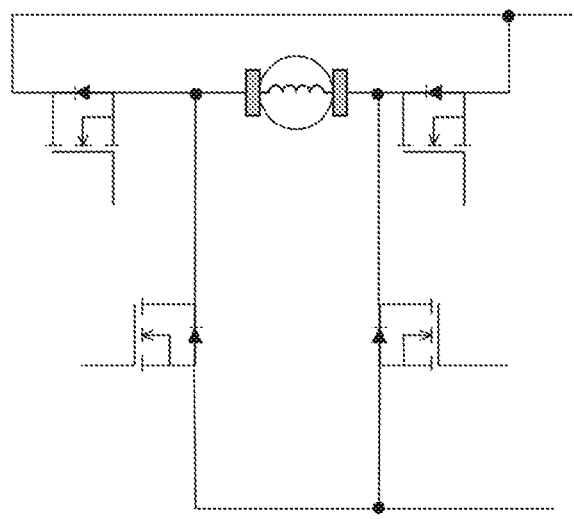
Figure 21:
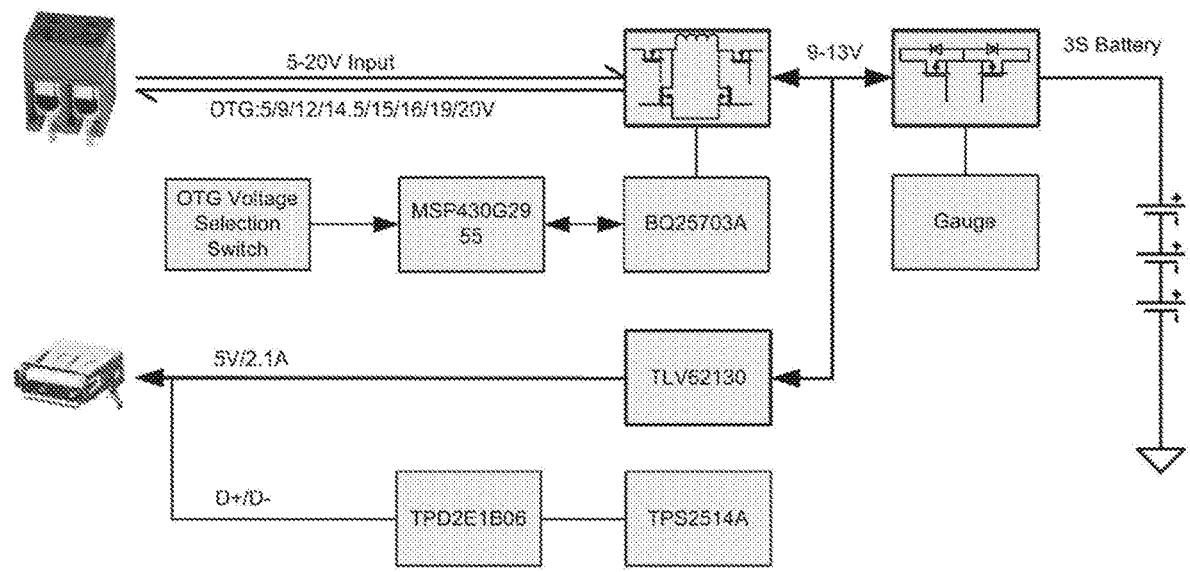
FIG. 21 shows a reference design for a buck/boost controller.

In another embodiment, shown in FIG. 20B, the buck/boost power stage is combined with the generator 106 and switches. Such an embodiment can reduce the parts count, such as the number of mosfets required in the design.

The configurations shown in FIGS. 20A and 20B can be implemented with N-channel mosfets, P-channel mosfets, or a combination of the two. Bipolar junction transistors (BPTs) can also be used. In one embodiment, the motor inductance is used as the inductive element in the buck/boost power stage, as shown in FIG. 20B. A combined RPM/direction sensor 139 can be used in this configuration so that the system can detect whether the generator is turning CW or CCW.

In another embodiment, a similar configuration is used in conjunction with BLDC motors with three windings. In such an embodiment, six mosfets may be used, two for each winding such that a standard BLDC motor control function is implemented.

Figure 22:
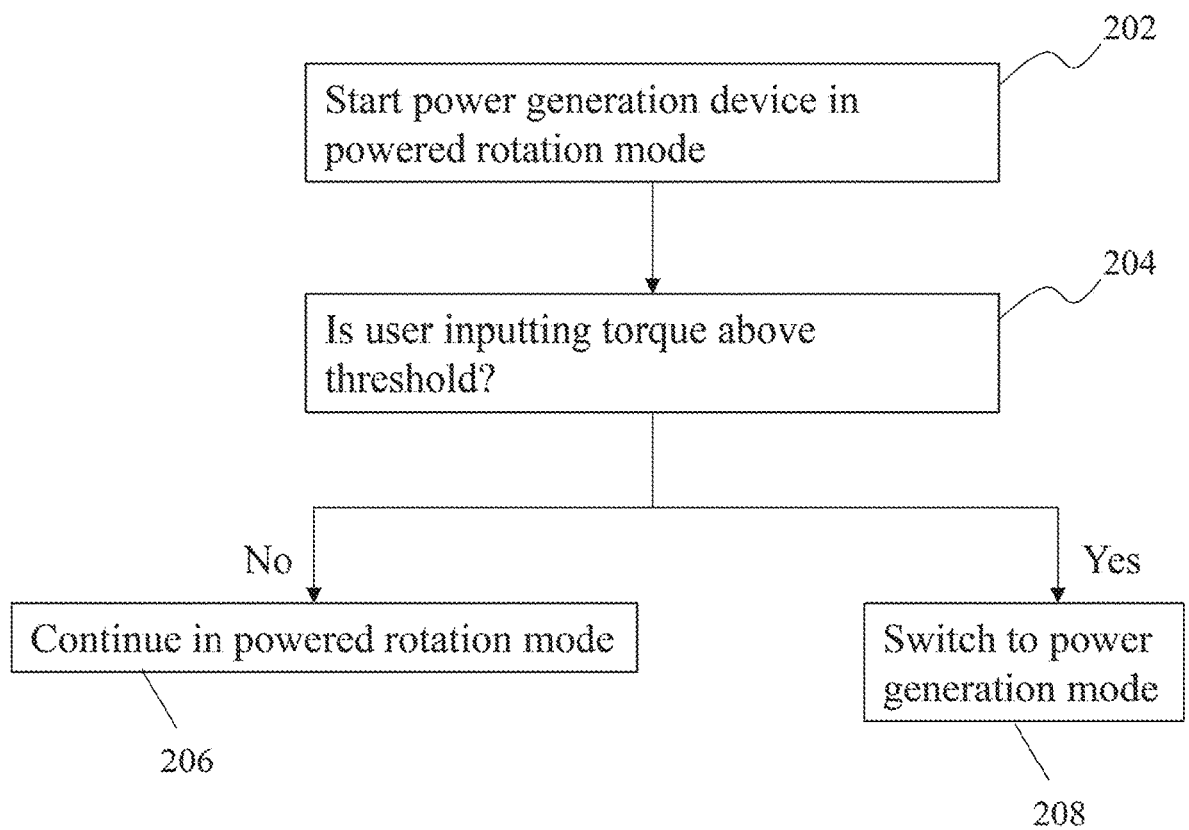
FIG. 22 is a flow diagram illustrating a method of powered rotation of a hub of a power generation device, according to at least one embodiment described herein.

FIG. 22 shows a flowchart of a powered startup of the generator 106. Such a process can allow the motor to be used to begin rotation of the hub 104. This can assist the user during startup. At block 202, the power generation device 100 starts in the powered rotation mode. At block 204, the power generation device 100 (e.g., using torque sensor 137) determines whether the user is providing input torque above a threshold level. If the user is not providing torque above the threshold, at block 206, the power generation device 100 continues in powered rotation mode. If the user is providing torque above the threshold, at block 208 the power generation device 100 switches to power generation mode. In other embodiments, the generator 106 powers rotation of the hub 104 for a specific length of time before switching from powered rotation mode to power generation mode. The length of time can be, for example, 3 seconds, 5 seconds, 10 seconds, between 3 seconds and 10 seconds, between 3 seconds and 5 seconds, or any other appropriate duration of time. When in powered rotation mode, the generator 106 can use energy stored in an internal battery.

In another embodiment, a power generation and storage system includes a power generation device 100 according to one of the embodiments described above and one or more rechargeable batteries. The rechargeable batteries can be in the form of a standard battery, such as a AA battery or a AAA battery, to allow the use of the rechargeable batteries with standard electronic devices. The rechargeable battery can include a USB interface that can be inserted into the output connector 116 of the generator 106 to allow charging of the rechargeable battery. For example, the rechargeable batteries can be similar to the USBCELL produced by Moixa Energy Ltd.

In another aspect, the power generation device 100 is integrated with, and configured to power, an external device 118 that is an emergency signal device. The emergency signal device is powered by the electrical output of the generator 106 and is configured to produce an emergency signal to aid in the location or rescue of the user. The emergency signal device can be, for example, a cellular phone. Alternatively, the emergency signal device can be a dedicated device configured specifically for sending an emergency signal. The emergency signal device can be configured with an application or other software that allows the device to be powered on with a minimum amount of battery charge. The emergency signal can be in the form of a text message, for example. In one embodiment, the text message includes text that indicates that assistance is required. In one embodiment, the emergency signal includes location information of the device at the time the signal is sent, for example latitudinal and longitudinal coordinates. Additionally, or alternatively, the emergency signal device may transmit an image or recording (e.g., a voice recording). In some circumstances, such a transmission may be more reliable than executing a two-way phone call.

In one embodiment, the user can customize the emergency signal in advance and determine the recipients of the message. The emergency signal device can also allow the user to input the type of emergency (i.e., terrorism, police required, lost, etc.) prior to sending the signal. After sending the signal, the emergency signal device can be automatically placed in a low power mode to retain power in the device for as long as possible.

In some embodiments, immediately upon the emergency signal device being powered on, the application or software causes the emergency signal to be transmitted. In other embodiments, the user may initiate transmission of the emergency signal by pressing a button or otherwise interacting with the power generation device 100 (e.g., using user interface 111). In still other embodiments, the user initiates the transmission of the emergency signal using external device 118. For example, in embodiments in which external device 118 is a smartphone, the user may interact with a touch screen on the phone to initiate transmission of the emergency signal.

Figure 23:
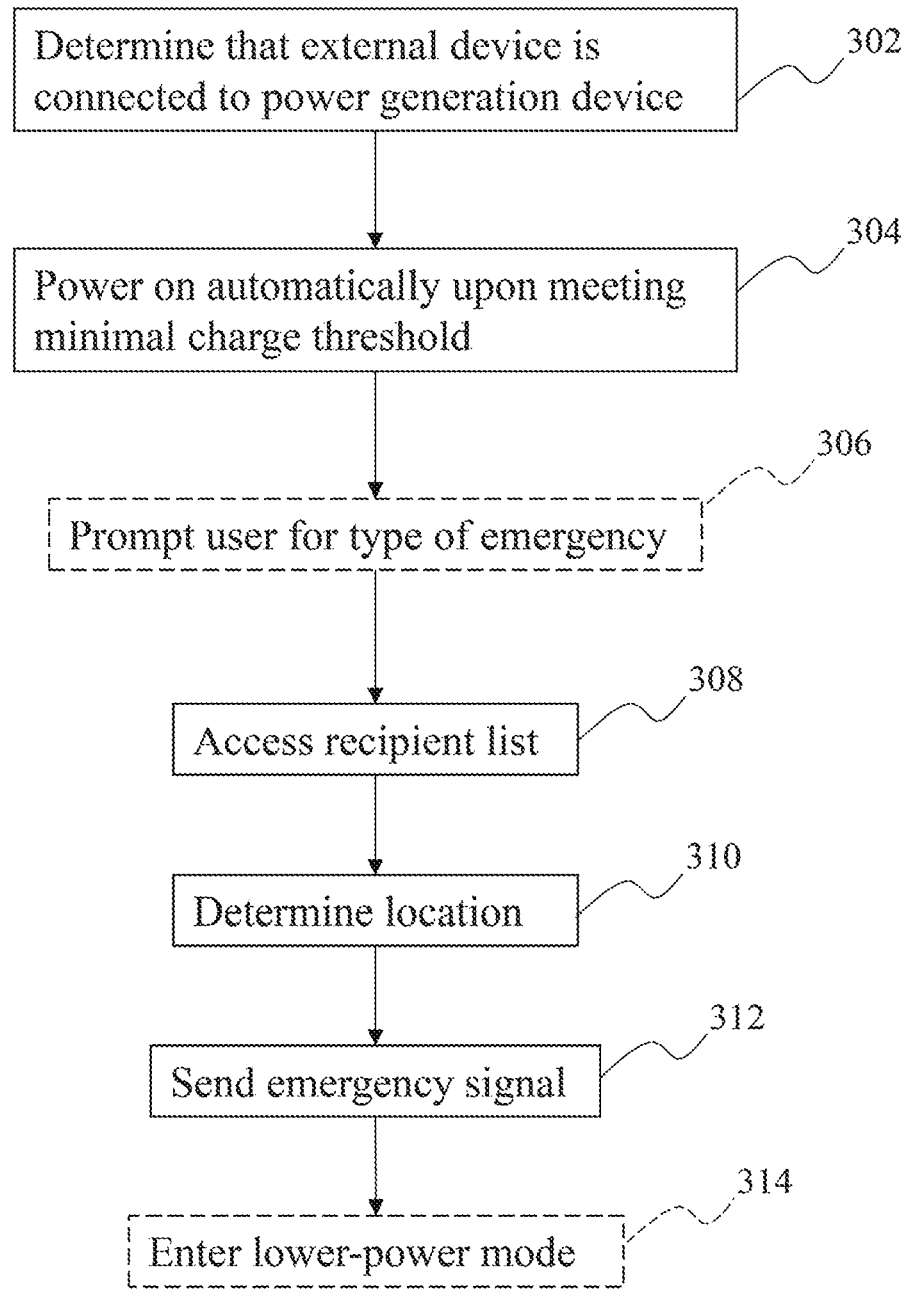
FIG. 23 is a flow chart illustrating a method of providing an emergency signal.

A method of generating and sending an emergency signal is also provided and illustrated in FIG. 23. At block 302, the external device 118 first determines that is connected to the power generation device 100. At block 304, the external device 118 powers on upon meeting a minimal charge threshold. In one embodiment, the minimal charge threshold when connected to the power generation device 100 is less than when it is not connected. For example, the external device 118 can power on in a low-power mode in which not all of the device's normal systems are running. Optionally, after powering on, at block 306, the device prompts the user for the type of emergency (i.e., terrorism, police required, lost, etc.). The prompt may appear on the power generation device 100 or on the external device 118. At block 308, the device accesses a recipient list to which the signal will be sent. The recipient list can be prepopulated by the user or, alternatively, can be selected by the user at the time of sending the signal. At block 310, the device determines the location of the device, for example, the latitudinal and longitudinal position of the device. At block 312, the device sends an emergency signal. Optionally, after sending the signal, at block 314, the device can enter a lower-power mode to conserve energy.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention. All patents and published patent applications identified herein are incorporated herein by reference in their entireties.

What is claimed is:

1. A portable power generation device, comprising:
a body extending from a first end to a second end, the body configured to be held in a hand of a user, wherein a longitudinal axis extends from the first end to the second end;
an electric generator housed within the body, the generator including a rotor;
a hub coupled to the body at the first end and rotatable with respect to the body about the longitudinal axis;
an arm extending from the hub such that the arm is rotatable with the hub about the longitudinal axis, wherein the arm is pivotably coupled to the hub such that the arm is pivotable with respect to the hub about a pivot axis that is non-collinear with the longitudinal axis; and
a knob coupled to the arm at an end of the arm opposite the hub, wherein the knob is rotatable with respect to the arm about an arm longitudinal axis that extends from a first end of the arm to a second end of the arm; and
wherein rotation of the hub and the arm about the longitudinal axis causes rotation of the rotor of the generator to generate electrical power.

2. The power generation device of claim 1, wherein the knob is configured to be grasped by the user to rotate the arm and the hub about the longitudinal axis.

3. The power generation device of claim 1, wherein the pivot axis is tangent to a circle centered on the longitudinal axis of the body.

4. The power generation device of claim 1, wherein the knob is configured to rotate with respect to the arm about an axis that is parallel to the pivot axis.

5. The power generation device of claim 1, wherein the hub and the arm are removably coupled and the hub is configured to couple to a driving device such that the driving device controls rotation of the rotor.

6. The power generation device of claim 1, wherein the knob has a mass of between about 20 grams and about 70 grams.

7. The power generation device of claim 1, wherein the arm includes a first shaft and a second shaft, and wherein the first shaft and the second shaft are configured to telescope with respect to one another to increase a length of the arm.

8. The power generation device of claim 7, wherein the first shaft and the second shaft are slip-fit to one another.

9. The power generation device of claim 1, wherein the torque required to rotate the arm and the hub with respect to the body is an adjustable variable.

10. The power generation device of claim 9, wherein the torque required to rotate the arm is controlled by a controller, and wherein the controller controls the torque required to rotate the arm using pulse width modulation.

11. The power generation device of claim 9, wherein the torque required to rotate the arm is controlled by a controller using an AI algorithm.

12. The power generation device of claim 1, further comprising a gearbox rotatably coupling the hub and the rotor of the electric generator such that the hub and the rotor rotate at different rotational speeds.

13. The power generation device of claim 1, further comprising a controller, wherein the generator operates in either an electrical power generation mode or a mechanical power generation mode, wherein when operating in the mechanical power generation mode, the generator causes the rotor to rotate, thereby rotating the hub and the arm.

14. The power generation device of claim 1, wherein the pivot axis is transverse to the longitudinal axis of the body.

15. The power generation device of claim 1, further comprising a user interface and an output connector, wherein the output connector is configured to couple to a tool such that the tool receives electrical energy from the generator and the tool is controllable via the user interface.

16. An emergency signal generating system, comprising: the portable power generation device of claim 1; and a communications device configured to be electrically coupled to the power generation device; wherein the communications device is configured to, after receiving power from the power generation device, transmit data to a communications network.

17. The emergency signal generating system of claim 16, wherein the communications device is configured to transmit the data automatically upon meeting a minimum charge threshold.

18. The emergency signal generating system of claim 16, wherein the data transmitted to the communications network includes the latitude and longitude of the communications device.

19. The power generation device of claim 1, wherein the knob is simultaneously rotatable about the arm longitudinal axis and another axis orthogonal to the arm longitudinal axis.

20. The power generation device of claim 1, wherein the knob is simultaneously rotatable about the arm longitudinal axis and two other axes, at least one of the two other axes being orthogonal to the arm longitudinal axis.

* * * * *